US012002671B2

(12) United States Patent
Makarov et al.

(10) Patent No.: US 12,002,671 B2
(45) Date of Patent: Jun. 4, 2024

(54) ELECTRODE ARRANGEMENT

(71) Applicant: Thermo Fisher Scientific (Bremen) GmbH, Bremen (DE)

(72) Inventors: Alexander A. Makarov, Bremen (DE); Wilko Balschun, Bremen (DE); Jan-Peter Hauschild, Weyhe (DE); Denis Chernyshev, Bremen (DE); Eduard V. Denisov, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 90 days.

(21) Appl. No.: 17/830,984

(22) Filed: Jun. 2, 2022

(65) Prior Publication Data

US 2022/0293409 A1 Sep. 15, 2022

Related U.S. Application Data

(62) Division of application No. 16/876,916, filed on May 18, 2020, now Pat. No. 11,387,093.

(30) Foreign Application Priority Data

May 21, 2019 (GB) .................................... 1907139

(51) Int. Cl.

| | |
|---|---|
| ***H01J 49/06*** | (2006.01) |
| ***H01J 49/00*** | (2006.01) |
| ***H01J 49/42*** | (2006.01) |

(52) U.S. Cl.

CPC ........ *H01J 49/063* (2013.01); *H01J 49/0045* (2013.01); *H01J 49/068* (2013.01); *H01J 49/4215* (2013.01); *H01J 49/4225* (2013.01)

(58) Field of Classification Search

CPC .... H01J 49/063; H01J 49/068; H01J 49/0045; H01J 49/4215; H01J 49/4225

See application file for complete search history.

(56) References Cited

U.S. PATENT DOCUMENTS 9,536,722 B2 * 1/2017 Grinfeld ............... H01J 49/068
9,870,906 B1 * 1/2018 Quarmby ............ H01J 49/4255
2005/0258364 A1 * 11/2005 Whitehouse ............ H01J 49/42 250/283

* cited by examiner

*Primary Examiner* — David E Smith

(57) ABSTRACT

The present invention provides an electrode arrangement 10, 10' for an ion trap, ion filter, an ion guide, a reaction cell or an ion analyser. The electrode arrangement 10, 10' comprises an RF electrode 12*a*, 12*b*, 12*a'*, 12*b'* mechanically coupled to a dielectric material 11. The RF electrode 12*a*, 12*b*, 12*a'*, 12*b'* is mechanically coupled to the dielectric material 11 by a plurality of separators 13 that are spaced apart and configured to define a gap between the RF electrode 12*a*, 12*b*, 12*a'*, 12*b'* and the dielectric material 11. Each of the plurality of separators 13 comprises a projecting portion 13*b* and the dielectric material 11 comprises corresponding receiving portions 11*a* such that on coupling of the RF electrode 12*a*, 12*b*, 12*a'*, 12*b'* to the dielectric material 11, the projecting portion 13*b* of each separator 13 is received within the corresponding receiving portion 11a of the dielectric material 11. The present invention also relates to an ion trap comprises the electrode arrangement 10, 10' and a method of manufacturing the electrode arrangement 10, 10'.

20 Claims, 22 Drawing Sheets

ELECTRODE ARRANGEMENT

PRIORITY

This application is a Divisional of U.S. application Ser. No. 16/876,916 filed May 8, 2020, which is a 371 National Phase application from UK Patent Application 1907139.8, filed on May 21, both of which are hereby incorporated by reference.

FIELD OF THE INVENTION

This invention relates to an improved electrode arrangement for an ion guide, ion filter, ion trap, ion storage device, ion reaction cell, in particular an ion collision cell, or an ion analyser, in particular a mass analyser.

BACKGROUND TO THE INVENTION

Mass spectrometry is an important technique for analysis of chemical and biological samples. In general, a mass spectrometer comprises an ion source for generating ions from a sample, various lenses, ion guides, mass filters, ion traps/storage devices, and/or reaction cell(s), and one or more mass analysers.

A reaction cell may be a collision and/or fragmentation cell. The reaction in the reaction cell may be an electron capture dissociation, a higher energy collisional dissociation (HCD), an electron-transfer dissociation, oxidation, hybridisation, clustering or complex reaction. The reaction cell may comprise a quadrupole or a hexapole, a octopole or a higher order multipole device.

Known electrode arrangements for ion guides, ion traps/storage devices and reaction cells typically comprise RF electrodes for radial confinement of ions and DC electrodes for driving ions along an axis of the ion guide/ion trap/storage device/reaction cell. Such an electrode arrangement may comprise RF electrodes in the form of rods having a circular or hyperbolic cross-section arranged to form a multipole or a mass filter. These electrodes could be mounted on dielectric spacers as presented in GB2554626, U.S. Pat. Nos. 5,616,919, 7,348,552. The electrode arrangement may also comprise DC electrodes arranged to provide a DC field along the axis of the ion guide, ion trap, storage device or reaction cell.

In order to simplify the manufacture of electrode arrangements for ion guides, planar configurations, such as those discussed in U.S. Pat. No. 9,536,722B2, have been designed. The planar configurations also provide greater flexibility for the design of the DC field. Such planar configurations could be implemented with printed circuit boards (PCBs) to which planar RF and DC electrodes are connected. The PCBs are formed of non-conductive material, normally a dielectric material that may be reinforced, such as fiberglass. Typically, the planar RF electrodes extend axially along the length of the ion guide in an arrangement to form an RF multipole. The DC electrodes also extend axially along the length of the ion guide thereby providing a DC field along its axis. The planar RF electrodes may be secured to the surface of a PCB by glue or soldering. A spacer made from the dielectric material of the PCB may be provided along the length of the planar RF electrode between the PCB and the RF electrode. The DC electrodes may be etched onto the PCB surface. Typically, the DC electrodes are provided on portions of the PCB surface that are adjacent to the RF electrodes such that the DC electrodes are separated from the RF electrodes by the dielectric (PCB) material.

However, as a result of such a planar design, the RF field created by the RF electrodes penetrates the dielectric material of the PCB in areas that are not shielded by the DC electrodes. This penetration causes heating of the PCB by dielectric loss. More specifically, the RF field penetrating the material of the PCB causes energy to be dissipated as the molecules of the dielectric (PCB) material attempt to line up with the continuously changing RF field. This dielectric loss is described by the dissipation factor, Df, which will be discussed in further detail in the detailed description. The heating of the PCB causes material of the PCB to evaporate (outgassing). The glue used to secure the RF electrode(s) to the PCB may also evaporate. The evaporated material (and glue) may contaminate the ions contained within the ion guide. Those contaminants may be carried through the spectrometer to the detector and so peaks corresponding to the contaminants may be generated in the resulting mass spectra. The contaminants may also cause undesirable changes to the analyte contained within the ion guide. For example, the contaminants may combine with the analyte molecules thereby forming adducts and/or react with the analyte molecules and remove part of their charge (charge reduction). Both of these undesirable changes to the analyte will generate erroneous peaks in the resulting mass spectra. The ion guide/ion trap/storage device/collision cell may also have a buffer gas therein. The heat generated in the dielectric (PCB) material may provide sufficient energy to buffer gas molecules thereby causing reactions of the analyte with the buffer gas molecules. For example, the buffer gas molecules may react with and combine with the analyte molecules forming adducts. The reaction of buffer gas molecules with analyte molecules may also reduce the charge on analyte molecules. Accordingly, these reactions cause undesirable changes to the analyte molecules. In collision cells, the ions are stored for longer periods of time (for example a number of milliseconds) and are exposed to stronger RF fields compared to ion guides. Indeed, collision cells typically operate at RF voltages of 1200-1500 V, which is much greater than that of ion guides, which typically operate at less than 1000V. Accordingly, the heating of PCBs and consequent undesirable effects are particularly prominent for collision cells.

FIG. 1 is a schematic diagram of a known electrode assembly 1 having known first and second electrode arrangements 2, 2'. The first and second electrode arrangements 2, 2' have planar RF electrodes 3 extending in the longitudinal direction. The RF electrodes are attached to dielectric materials 4 by conductive glue/adhesive provided along the length of the planar RF electrodes 3. The planar RF electrodes 3 are maintained in alignment by grooves 5 extending in the longitudinal direction forming a jig. DC electrodes 6 are provided on the surface of the dielectric material 4 on either side of the planar RF electrodes 3.

FIG. 1*a* shows a cross-section of the RF electrodes 3 of the known electrode assembly 1. Grooves 5 around the RF electrodes are provided to increase the tracking distance to the DC electrodes. In this assembly, the dielectric (PCB) material 4 is embedded in a support.

The results of an experiment, referred to herein as experiment 1, involving one isolated charge state (+11) of multiply charged ubiquitin ions which is trapped for 500 ms in a HCD (Higher-energy collisional dissociation) cell having the known electrode assembly 1 depicted in FIG. 1 are provided in FIGS. 2 to 4. In the experiment, at time 0:00 (0 hours, 0 minutes), a high RF voltage was applied to the RF electrodes 3 of the HCD cell (approximately 1,250 Vpp) for a time period of 1:12 (1 hour and 12 minutes). From the HCD cell, the isolated and trapped ubiquitin ions were then transferred to a C-trap and injected from the C-trap into an Orbitrap™ mass analyser for mass analysis. A C-trap is a curved linear ion trap, storing ion packets in time and then accelerating the ion packets into a mass analyser which is, for example, described in the patent application WO 2002/078046, WO2008/081334 WO2005/124821. An RF voltage of approximately 3,000 Vpp was applied to the RF electrodes of the C-trap adjacent to the HCD cell.

Two temperature sensors (e.g. platinum resistors with 100 Ohm resistance at room temperature, here and below $PT_{100}$) were used in this experiment. The first temperature sensor (PT100) was located on the dielectric material 4 of the PCB of the HCD cell, to which the planar RF electrodes 3 were attached. The first temperature sensor and the RF electrode were arranged at the same position within the plane of the dielectric material 4 except that the temperature sensor was attached to the opposite surface of the dielectric material 4 to the RF electrodes 3.

Accordingly the RF electrode 3 and the first temperature sensor were only separated by the thickness of the dielectric material 4. By locating the first temperature sensor close to the RF electrodes 3, the temperature measured by the first temperature sensor provided accurate results regarding the heating of the dielectric material 4 due to penetration of the RF field generated by the RF electrodes 3.

The second temperature sensor (OT block $PT_{100}$) was not arranged in the HCD cell. Instead, the second temperature sensor was positioned in the housing of the Orbitrap mass analyser close to the HCD cell. Accordingly, the second temperature sensor provided further results regarding the increase in temperature of the Orbitrap mass analyser caused by the RF field of the HCD cell.

FIG. 2 is a graph of extracted ion current per charge state and temperature of the HCD cell against time over the course of experiment 1. As shown in FIG. 2, after applying the maximum RF voltage to the HCD cell for 1 hour and 12 minutes, the extracted ion current for the isolated charge state (+11) measured by the Orbitrap mass analyser decreased from approximately 19 arb.u./sec to approximately 5 arb.u./sec. Accordingly, the intensity of the isolated charge state (+11) decreased by approximately 4 times over the course of the experiment. The extracted ion current for the charge state (+10) measured by the Orbitrap mass analyser increased from 2 arb.u./sec to 6.25 arb.u./sec. The extracted ion current for the isotope (+9) measured by the Orbitrap mass analyser increased from 0 arb.u./sec to 3.75 arb.u./sec. Accordingly, the ion intensity of reduced charge states having a reduced charge increased significantly over the course of the experiment. After applying the maximum RF voltage for 1 hour and 12 minutes, the total ion current of reduced charge states was approximately 5 arb.u./sec and the total ion current of the isolated charge state (+11) was approximately 4 arb.u./sec. Charge reduction is defined as the ratio of the sum of the extracted ion current of all peaks except for that of the isolated charge state (+11) against that of the isolated charge state (+11). Accordingly, the charge reduction when the maximum RF voltage had been applied to the HCD cell for 1 hour and 12 minutes exceeded 100%. After applying the maximum RF voltage to the HCD cell for 1 hour and 12 minutes, the temperature of the HCD cell was measured by the first temperature sensor and had increased by 20° C. It is understood that this increase in temperature of the HCD cell caused an increased rate of desorption and evaporation of glue and dielectric (PCB) material 4 in the electrode assembly 1. This consequently resulted in increased contamination of the HCD cell and increased charge reduction.

FIG. 3(*a*) is a figure of the mass spectrum acquired at the start of experiment 1 i.e. at the start of applying the maximum RF voltage to the HCD cell (at time 0:00). As shown in FIG. 3(*a*), the relative abundance of the isolated main isotope having charge state (+11) at the m/z value 777.966 at time 0:00 is at 100% and the relative abundance of each of the other isotopes is less than 5%. The relative abundance of an isotope is given by the ratio of the abundance of this isotope to the abundance of the isotope having the highest abundance (the isotope of 100% abundance). FIG. 3(*b*) is a figure of the mass spectrum acquired at the end of experiment 1, when the maximum RF voltage had been applied for 1 hour and 12 minutes. On comparing FIGS. 3(*a*) and 3(*b*), it can be seen that over the duration of the experiment, the relative abundance of the isolated main isotope having charge state (+11) has decreased from 100% to 80%. The relative abundances of the other (non-isolated) reduced charge states have significantly increased. For example, the relative abundance of the main isotope having the charge state (+9) is at 50%, and the relative abundance of the main isotope having the charge state (+10) is at 100%. Accordingly, significant charge reduction has occurred over the course of experiment 1.

FIG. 4 is an infrared photograph of the known HCD cell having the electrode assembly 1 of FIG. 1. The picture is taken from the top of the HCD cell such that the longitudinal direction of the electrode assembly 1 extends from the top to the bottom of the photograph. This photograph was taken 10 minutes after the HCD cell had been switched off, following completion of experiment 1. At this time of this photograph, the pressure of the HCD cell had been equilibrated with atmospheric pressure. This photograph demonstrates that the area of the HCD cell at the highest temperature (the lightest coloured part) is where the planar RF electrodes 3 are glued to the dielectric material 4. Heating of the HCD cell particularly occurs when RF voltages of high amplitude are applied the RF electrodes 3, which is the case in experiment 1.

It would be desirable to provide an electrode arrangement comprising a PCB with RF electrodes attached thereto that may operate without significant generation of heat thereby minimising outgassing and undesirable changes to analyte molecules, particularly when RF voltages of high amplitude are applied to the RF electrodes 3. Indeed, by providing such an electrode arrangement, for the first time, it would be possible to provide a reliable collision cell, such as a HCD cell, having an electrode arrangement that comprises a PCB with RF electrodes attached thereto.

Another problem with known electrode arrangements having PCBs is ensuring precise manufacturing. Therefore, it would also be desirable to provide a method for manufacturing electrode arrangements comprising PCBs having RF electrodes attached thereto at a greater level of precision than enabled by standard PCB production processes.

SUMMARY OF THE INVENTION

In accordance with a first aspect of the present invention, there is provided an electrode arrangement for an ion trap, ion filter, an ion guide, a reaction cell or an ion analyser, the electrode arrangement comprising an RF electrode mechanically coupled to a dielectric material, wherein the RF electrode is mechanically coupled to the dielectric material by a plurality of separators that are spaced apart and configured to define a gap between the RF electrode and the dielectric material and wherein each of the plurality of separators comprises a projecting portion and the dielectric material comprises corresponding receiving portions such that on coupling of the RF electrode to the dielectric material, the projecting portion of each separator is received within the corresponding receiving portion of the dielectric material. The plurality of separators may be any one of or a combination of the pin separator, receptacled separator or projecting separator described below.

In accordance with a first aspect of the present invention, there is provided an electrode arrangement as set out in claim 1.

The electrode arrangement of claim 1 comprises an RF electrode mechanically coupled to a dielectric material. The RF electrode is coupled to the dielectric material by a plurality of separators that are spaced apart and configured to define a gap between the RF electrode and the dielectric material. By providing the gap between the RF electrode and the dielectric material, penetration of the dielectric material close to the RF electrodes by the strong RF field in this region is avoided.

Each of the plurality of separators comprises a projecting portion and the dielectric material comprises corresponding receiving portion(s). The projecting portion of each separator is received within the corresponding receiving portion of the dielectric material. The coupling of the dielectric material is nearly limited to this connection. Each corresponding receiving portion(s) may have a shape that is complementary to the projecting portion of the separator(s) so as to receive the projecting portion.

Furthermore, a DC electrode located between the dielectric material and the RF electrode shields the dielectric material from the RF field generated by the RF electrode. This shielding prevents the RF field from penetrating the dielectric material and so prevents generation of heat within the dielectric material by dielectric loss. The only penetration of the RF field into the dielectric material occurs at the contact points between each separator and the dielectric material.

The use of a plurality of separators to generate the gap is advantageous, since a gap of a constant height may be achieved with minimal areas of contact between the RF electrode and the dielectric material. Indeed, by using a plurality of spaced apart separators, a DC electrode, and so DC field, may cover and shield the majority of the surface of the dielectric material that is directly above or underneath the RF electrode.

This is in contrast to known electrode arrangements whereby it is not possible for a DC electrode to extend along the majority of the dielectric surface that is directly above or underneath the RF electrode. Indeed, in known prior art, the majority of the dielectric surface that is directly above or underneath the RF electrode is covered with glue or solder or a spacer.

Furthermore, in known arrangements, such as in U.S. Pat. No. 7,348,552, typically a spacer made of the dielectric material is located between the surface of the PCB and the RF electrode to provide a gap between the PCB and the RF electrode and accordingly between the DC electrodes arranged on the surface of the PCB and the RF electrode. However, the dielectric material of the spacer, which is very close to the RF electrodes, is heated by the RF field of the RF electrodes. This heating causes the problems of contamination and charge reduction in an ion guide, ion filter, ion analyser, ion trap or reaction cell comprising the electrode arrangement.

Accordingly, operation of the electrode arrangement of the claimed invention results in significantly reduced generation of heat, and consequently reduced outgassing (evaporation of the dielectric (PCB) material). Therefore, fewer contaminants are produced and fewer undesirable changes to the analyte occur. Consequently, fewer erroneous peaks in the resulting mass spectra are generated.

Preferably, the electrode arrangement comprises at least one DC electrode located between the dielectric material and the RF electrode. As discussed above, the DC electrode and so DC field, may cover and shield the majority of the surface of the dielectric material that is directly above or underneath the RF electrode. This shielding prevents the RF field from penetrating the dielectric material and so prevents generation of heat within the dielectric material by dielectric loss. The only penetration of the RF field into the dielectric material occurs at the contact points between each separator and the dielectric material.

Preferably, the RF electrode has a face opposing the dielectric material and the DC electrode extends across the dielectric material such that at least a part of the DC electrode lies directly between the face of the RF electrode and the dielectric material. The proportion of the surface area of the face of the RF electrode which is shielded from the dielectric material by the DC electrode is at least 50%, preferably 80% and most preferably 95%. The term "shielding" refers to a significant reduction of electric field flux (at least an order of magnitude) generated by a charged electrode at a given point due to introduction of a shield. In the present invention, the RF field generated by the RF electrode is shielded by using a DC electrode as a shield. By providing a part of the DC electrode directly between the face of the RF electrode and the dielectric material, the shield is provided in the region of the dielectric material that would otherwise experience the strongest RF field. Accordingly, penetration of the RF field and generation of heat within the dielectric material is minimised.

Preferably, in the claimed invention, the plurality of separators are electrically conductive, and more preferably, metallic. Then the RF field of the RF electrodes penetrates only the dielectric material around the separators. But this is a very limited area of the RF electrodes. Due to the separators in general there is a gap between the RF electrodes and the dielectric material, which is preferably shielded by a DC electrode. This is in contrast to the known spacers, discussed above, which are formed of a dielectric material having dielectric losses. These spacers are located over the whole area of the RF electrodes close to the RF electrodes and are therefore penetrated (and heated) by their RF field.

BRIEF DESCRIPTION OF THE DRAWINGS

The invention may be put into practice in a number of ways and some specific embodiments will now be described by way of example only and with reference to the accompanying drawings in which:

FIG. 3(*b*) is a mass spectrum acquired at the end of experiment 1 (at time 1:12).

FIG. 14(*b*) is a mass spectrum acquired at the end of experiment 2 (at time 2:30).

DETAILED DESCRIPTION OF EMBODIMENTS

In this specification, the term RF electrode refers to an electrode to which an RF voltage supply is connected. The term DC electrode herein refers to an electrode to which a DC voltage supply is connected. The term "inner" in relation to a surface herein refers to the surface that is facing towards the centre of the electrode assembly 100. The term "outer" in relation to a surface herein refers to the surface that is facing away from the centre of the electrode assembly 100.

Figure 5:
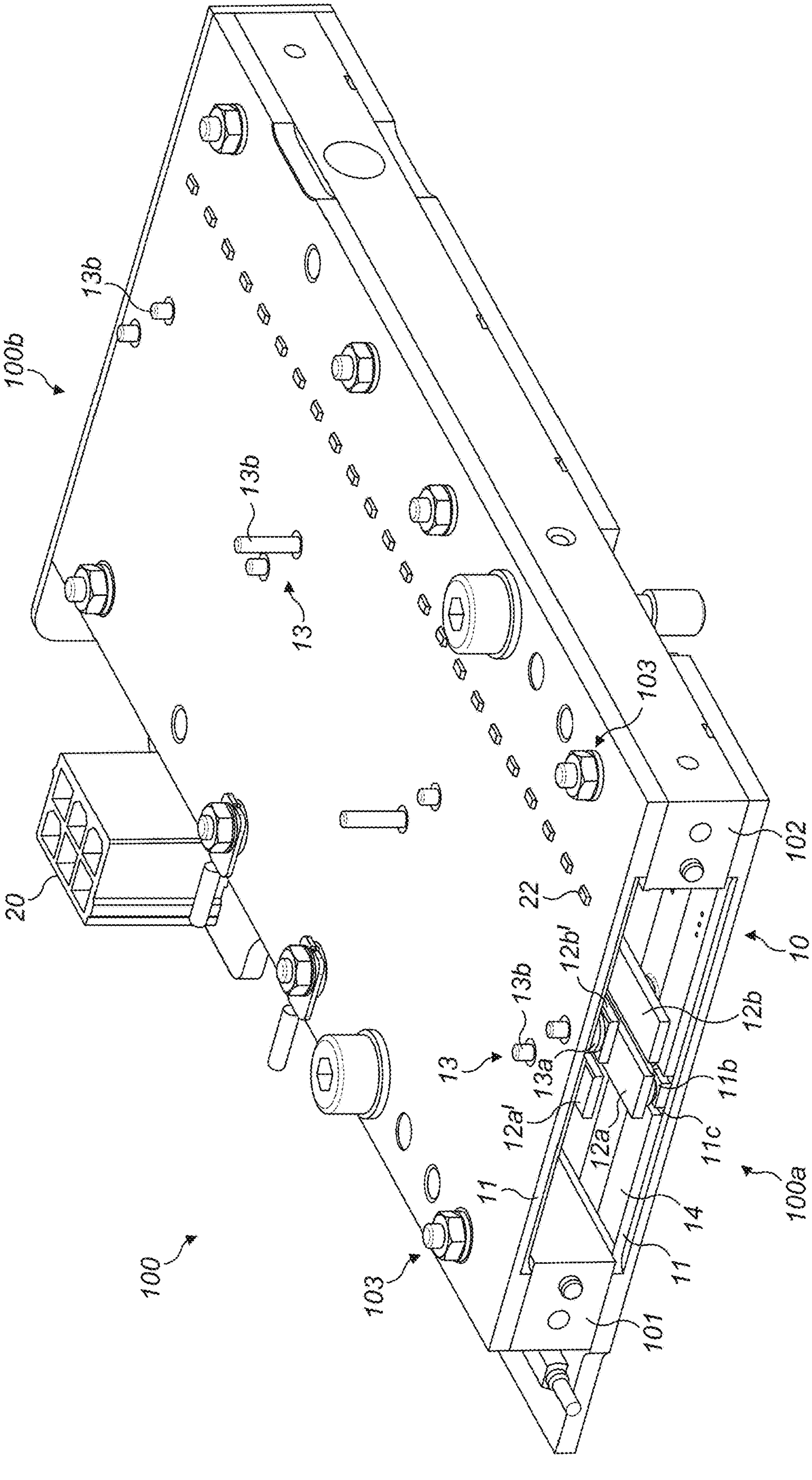
FIG. 5 is a schematic diagram of perspective view of an electrode assembly having first and second electrode arrangements, in accordance with an embodiment of the present invention.
Figure 5A:
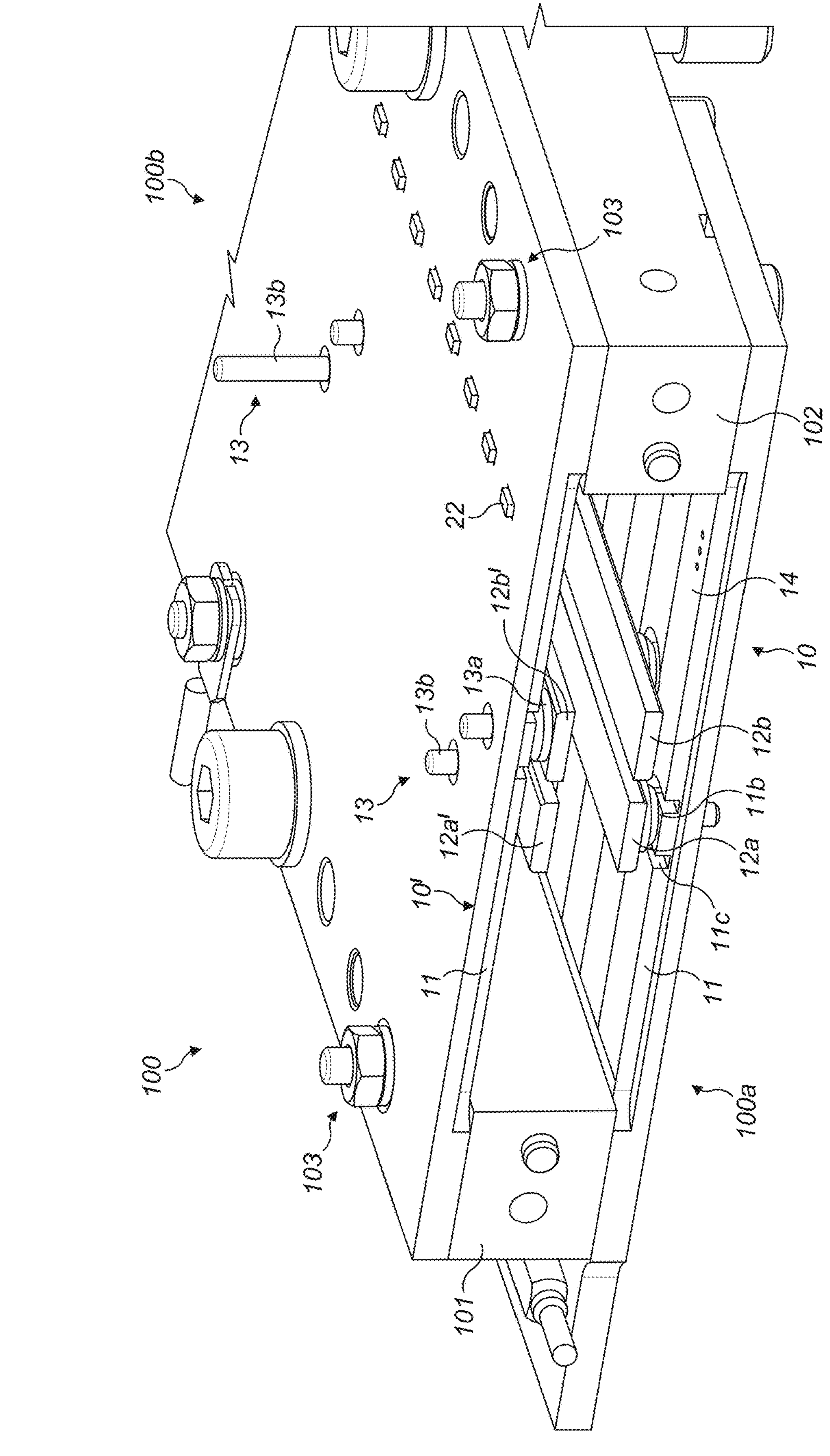
FIG. 5*a* is an enlarged view of FIG. 5.

FIG. 5 is a schematic diagram of a perspective view of an electrode assembly 100 in accordance with the present invention. The longitudinal axis of the electrode assembly 100 defines the longitudinal direction. The electrode assembly 100 extends in the longitudinal direction from a first end 100*a* to a second end 100*b*. The first and second ends 100*a*, 100*b* of the electrode assembly 100 are open/exposed for transport of ions therethrough.

The electrode assembly 100 has first and second electrode arrangements 10, 10' that extend in the longitudinal direction from the first end 100*a* to the second end 100*b*. Indeed, the term "electrode assembly" refers to an electrode arrangement, such as that of claim 20, having both first and second electrode arrangements 10, 10'. The first and second electrode arrangements 10, 10' are spaced apart from each other and parallel thereto such that the first and second electrode arrangements are substantially mirror images of each other with the axis of symmetry corresponding with the central longitudinal axis of the electrode assembly 100. The first and second electrode arrangements 10, 10' are spaced apart by first and second minor side walls 101, 102. Indeed, as shown in FIG. 5, the second electrode arrangement 10' is supported above the first electrode arrangement 10 by the first and second minor side walls 101, 102. The first and second minor side walls 101, 102 are parallel to each other and extend along the major edges of the electrode assembly 100. In the present disclosure the term "minor" is used to indicate a small dimension (e.g. area or length) and the term "major" is used to indicate a larger dimension. The minor side walls comprise connectors 103, such as nuts and bolts, configured to provide mechanical connection between the first and second electrode arrangements 10, 10'.

As shown in FIG. 5, each electrode arrangement 10, 10' has a dielectric material 11 forming a printed circuit board (PCB) configured to provide electrical connection to the components of the electrode arrangements 10, 10'. The dielectric materials 11 are planar (i.e. their length and width dimensions, which are parallel to the planar dielectric surface, are greater than their thickness dimension). The first and second electrode arrangements 10 10' are arranged such that the plane of the planar dielectric material 11 of each electrode arrangement 10, 10' are arranged parallel to each other and facing each other. Each dielectric material 11 has an inner major surface facing towards the centre of the electrode assembly 100. Each dielectric material 11 has an outer major surface facing away from the centre of the electrode assembly 100. The dielectric material 11 extends across the entire width of the electrode assembly 100 (in the transverse direction) and between the first and second ends 100*a*, 100*b* of the electrode assembly 100 (in the longitudinal direction). Accordingly, the dielectric material 11 also extends across the entire width of each electrode arrangement 10, 10'. Preferably, the dielectric material 11 is formed of Megtron6 due to its low dielectric losses.

As best shown FIG. 5, each electrode arrangement 10, 10' comprises first and second RF electrodes 12*a*, 12*b*, 12*a'*, 12*b'* attached to the inner major surface of the dielectric material 11. The RF electrodes 12*a*, 12*b*, 12*a'*, 12*b'* are elongate, extending in the longitudinal direction of each electrode arrangement 10, 10' from the first end 100*a* to the second end 100*b*. Indeed, the RF electrodes 12*a*, 12*b*, 12*a'*, 12*b'* extend over the entire length of the dielectric material 11. The RF electrodes 12*a*, 12*b*, 12*a'*, 12*b'* are planar (i.e. their length and width dimensions, which are parallel to the planar dielectric surface, are greater than their thickness dimension, which is orthogonal to the planar dielectric surface). The RF electrodes 12*a*, 12*b* of the first electrode arrangement 10 are arranged parallel to, facing and spaced apart from the RF electrodes 12*a'*, 12*b'* of the second electrode arrangement 10'. In each electrode arrangement 10, 10', the first RF electrode 12*a*, 12*b* is spaced apart from the second RF electrode 12*a'*, 12*b'*. The RF electrodes 12*a*, 12*b*, 12*a'*, 12*b'* are electrically conductive. The RF electrodes 12*a*, 12*b*, 12*a'*, 12*b'* are metallic, typically formed of stainless steel or nickel.

Figure 6:
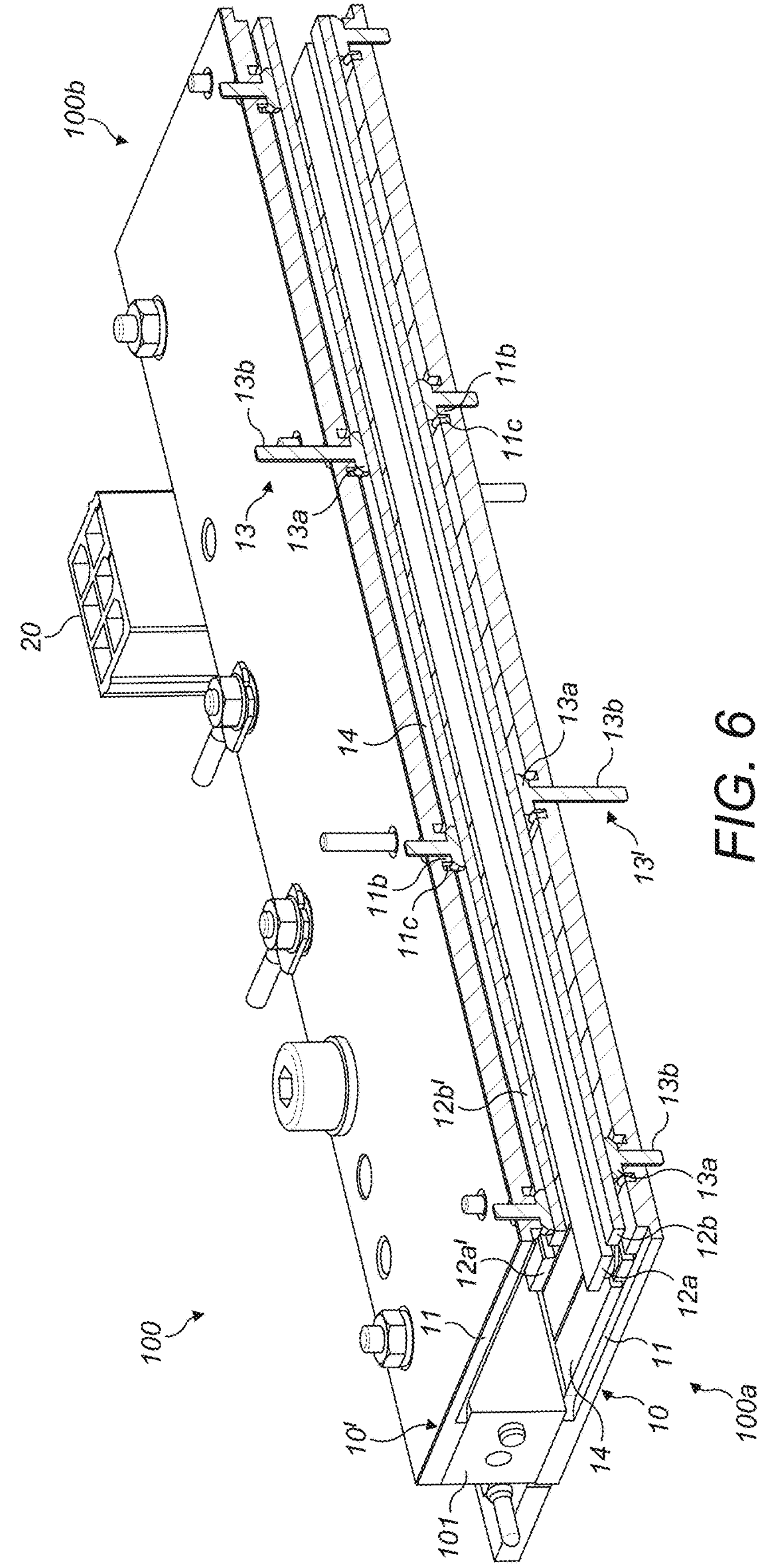
FIG. 6 is a schematic diagram of a longitudinal section of the electrode assembly of FIG. 5, in accordance with an embodiment of the present invention.

In the embodiment shown in FIGS. 5 to 10, each RF electrode 12*a*, 12*b*, 12*a*', 12*b*' is mechanically coupled to their respective dielectric material 11 by a plurality of (at least two) pin separators 13 that are spaced apart from each other. The pin separators 13 are preferably equally spaced apart. The pin separators 13 are configured to define a gap between the RF electrode and the dielectric material 11. The gap is provided in the direction orthogonal to the plane of the dielectric material 11. The pin separators 13 are electrically conductive and typically formed of copper or the same material as RF electrodes. In the embodiment of FIGS. 5 to 10, and as best shown in FIG. 6, each RF electrode 12*a*, 12*b*, 12*a*', 12*b*' is coupled to the dielectric material 11 by four pin separators 13.

Each pin separator 13 is attached to a major (planar) surface of the RF electrode 12*a*, 12*b*, 12*a*', 12*b*'. Preferably, the pin separator 13 is permanently attached to the surface of the RF electrode 12*a*, 12*b*, 12*a*', 12*b*'. Typically, the pin separator 13 is attached to the surface of the RF electrode by welding. Each pin separator 13 comprises a head portion 13*a* and a projecting portion 13*b*.

The head portion 13*a* is attached to the outer major surface of the RF electrode 12*a*, 12*b*, 12*a*', 12*b*' (the planar surface of the RF electrode 12*a*, 12*b*, 12*a*', 12*b*' that is proximal to and opposing the respective dielectric material 11) such that a projecting portion 13*b* extends from the head portion 13*a* in a direction orthogonal to the plane of the RF electrode 12*a*, 12*b*, 12*a*', 12*b*' and orthogonal to the plane of the dielectric material 11. The head portion 13*a* has at least electrical contact with the RF electrode 12*a*, 12*b*, 12*a*', 12*b*'.

Figure 7:
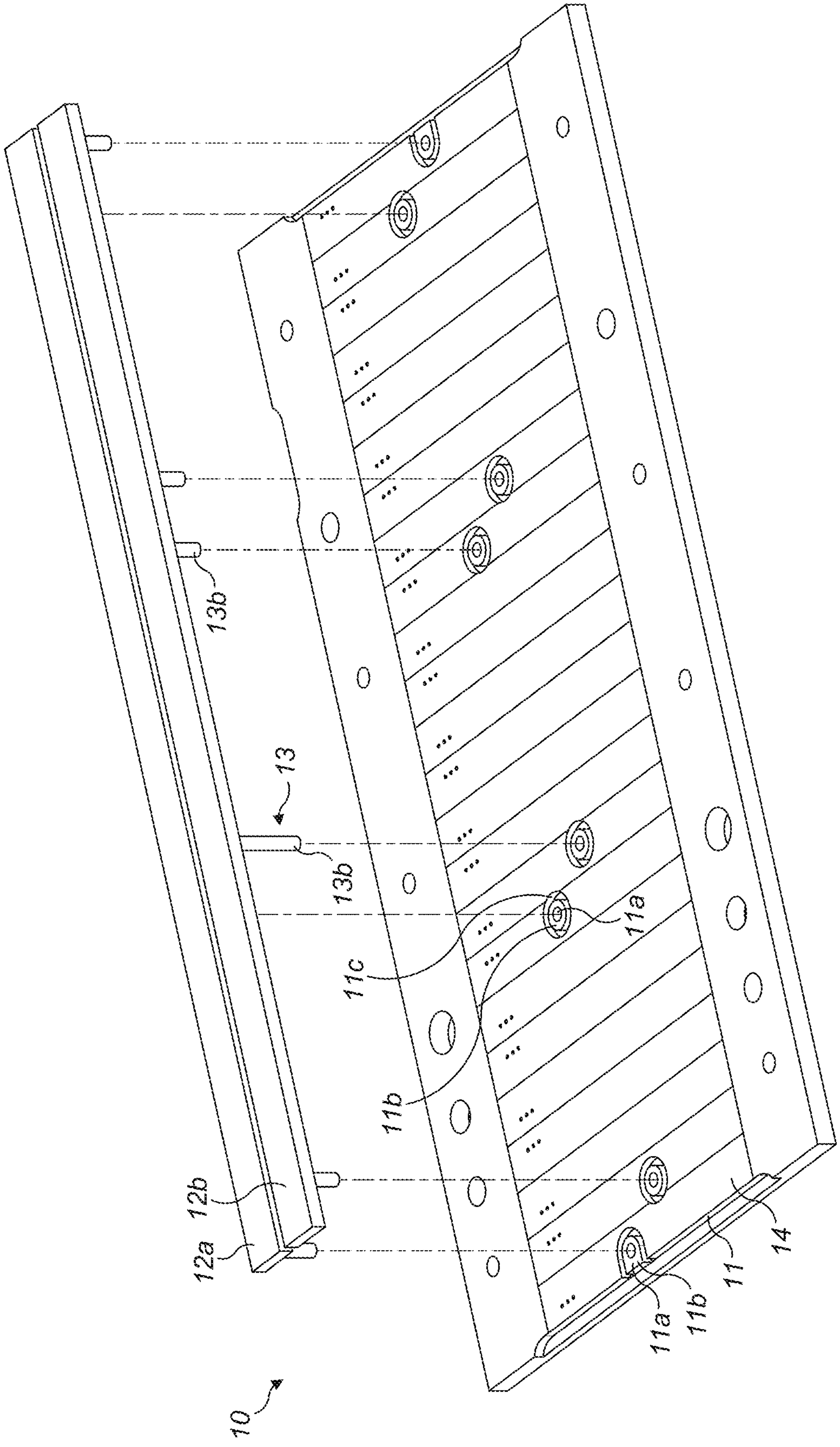
FIG. 7 is a schematic diagram of an exploded view of the first electrode arrangement of FIGS. 5 and 6, in accordance with an embodiment of the present invention.
Figure 8:
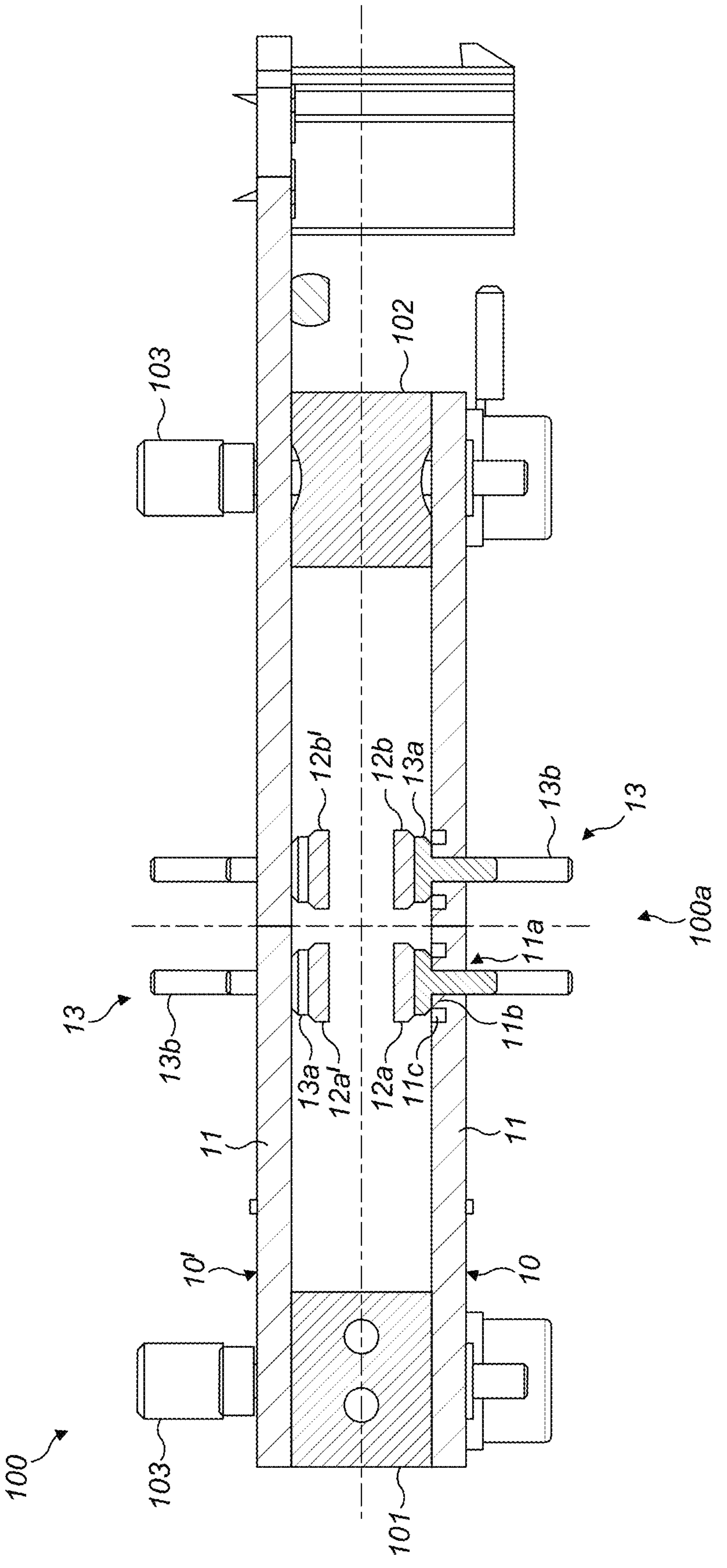
FIG. 8 is a schematic diagram of a cross-section of the electrode assembly of FIGS. 5 to 7, in accordance with an embodiment of the present invention.
Figure 9:
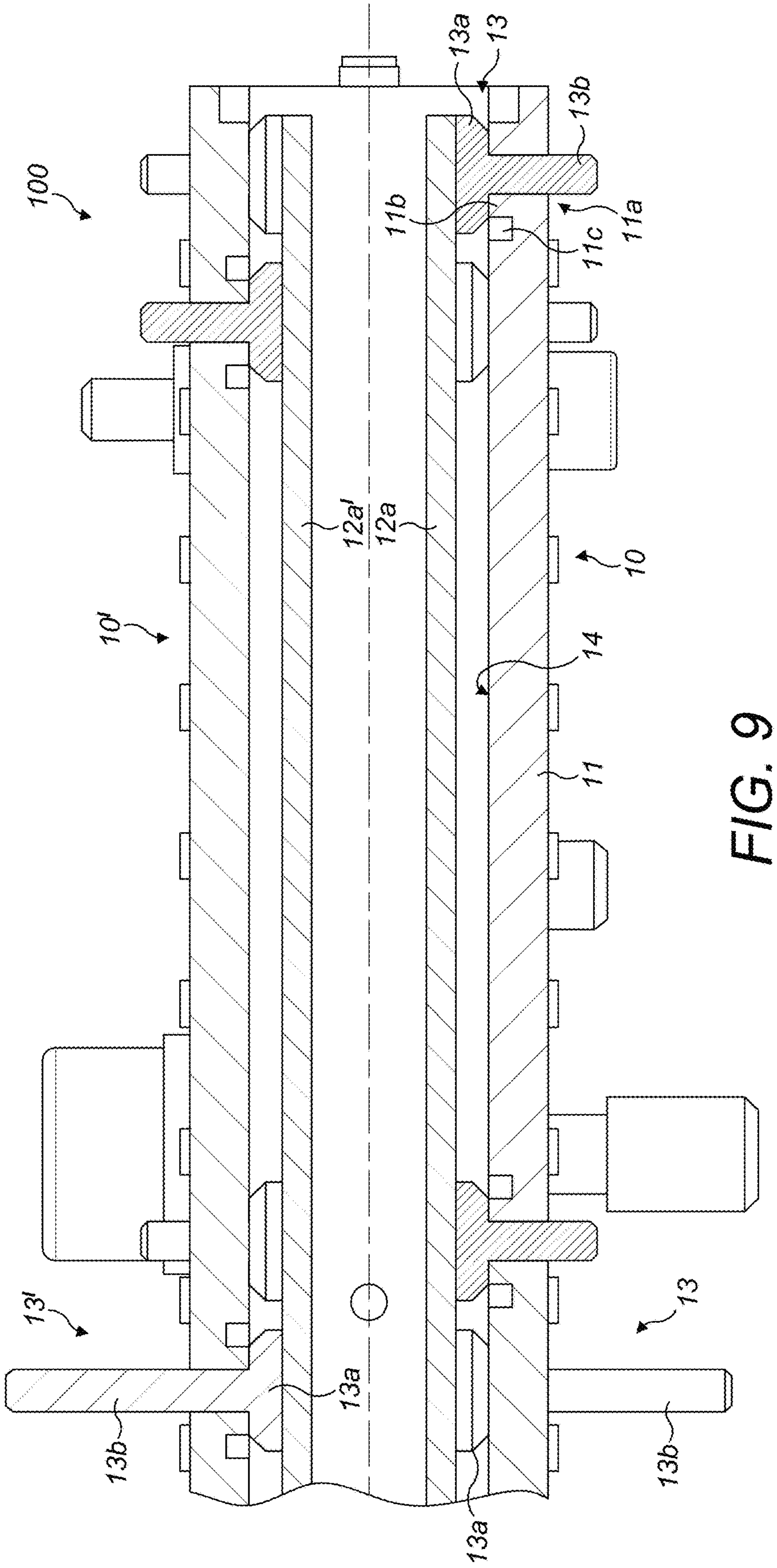
FIG. 9 is a schematic diagram of a portion of a longitudinal-section of the electrode assembly of FIGS. 5 to 8, in accordance with an embodiment of the present invention.
Figure 10:
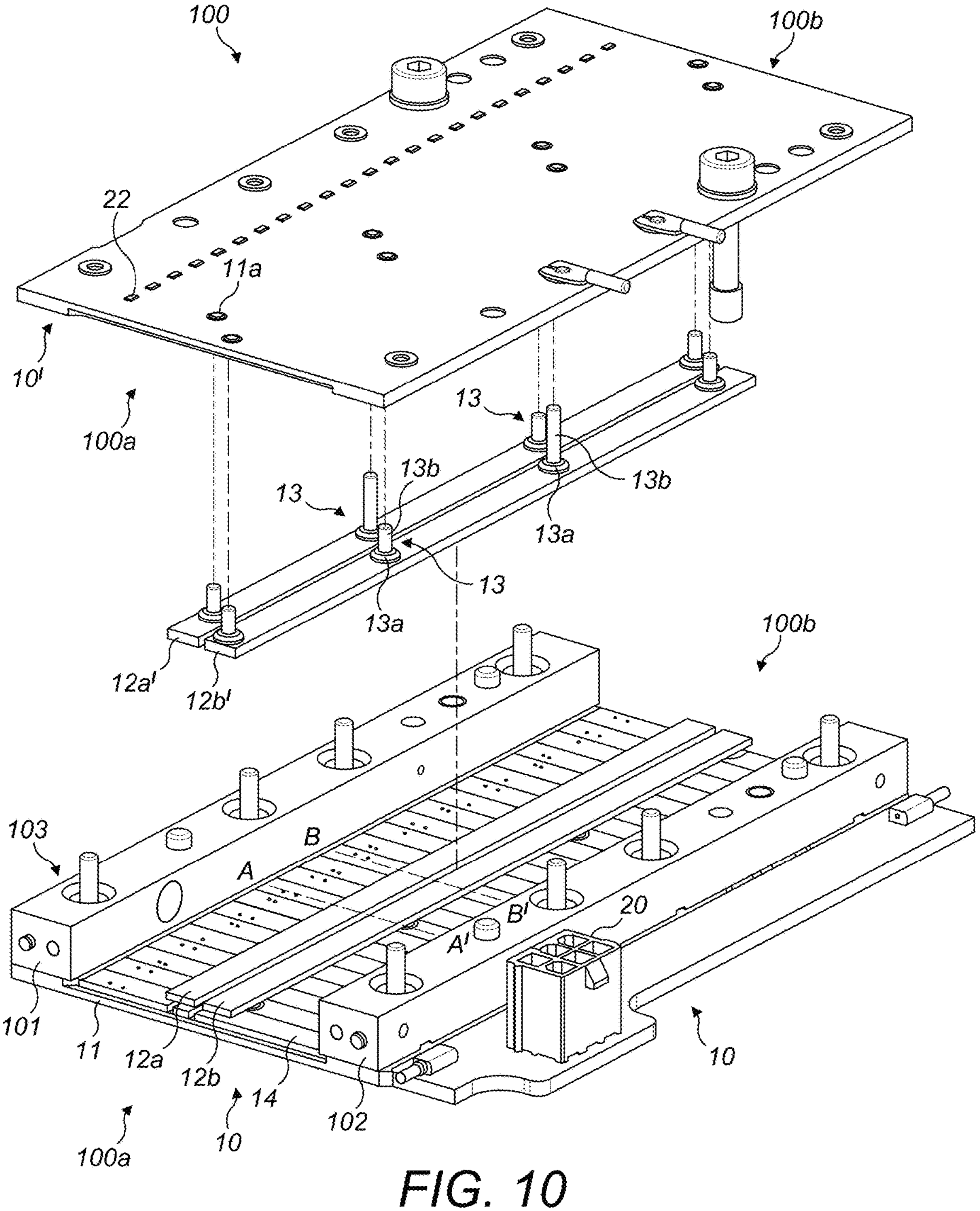
FIG. 10 is a schematic diagram of an exploded view of the electrode assembly of FIGS. 5 to 9, in accordance with an embodiment of the present invention.

The dielectric material 11 has a corresponding receiving portion 11*a* configured to receive the projecting portion on coupling of the RF electrode 12*a*, 12*b*, 12*a*', 12*b*' to the dielectric material 11. In the embodiment shown in FIGS. 5 to 10, and as best shown in FIGS. 7 to 10, the corresponding receiving portion 11*a* is a through-hole extending through the thickness of the dielectric material 11. The diameter of the projecting portion 13*b* is such that the projection portion 13*b* is received and retained in the through-hole 11*a*. The diameter of the head portion 13*a* is preferably greater than that of the through-hole 11*a* such that the head portion 13*a* abuts the dielectric material 11 on coupling of the RF electrode 12*a*, 12*b*, 12*a*', 12*b*' and dielectric material 11 together. The head portion 13*a* is preferably planar with its thickness dimension orthogonal to the plane of the RF electrode 12*a*, 12*b*, 12*a*', 12*b*'. The height of the gap between the RF electrode 12*a*, 12*b*, 12*a*', 12*b*' and the dielectric material 11 to which it is mechanically connected is primarily determined by the thickness of the head portion 13*a*. Indeed, as shown in FIGS. 8 and 9, the height of the gap between the RF electrode 12*a*, 12*b*, 12*a*', 12*b*' and its respective dielectric material 11 is approximately the same as the thickness of the head portion 13*a*. Accordingly, by providing at least two such pin separators 13 spaced apart from each other, the gap between each RF electrode 12*a*, 12*b*, 12*a*', 12*b*' and the respective dielectric material 11 is of constant height. Typically, the thickness of the head portion 13*a*, and so the height of the gap, is 1 to 2 mm, preferably 1.5 mm. In the embodiment of FIGS. 5 to 10, and as best shown in FIG. 10, the head portion 13*a* is disc shaped.

In the embodiment of FIGS. 5 to 10, and as best shown in FIG. 10, the projecting portion 13*b* is cylindrical and has a length of greater magnitude than the thickness of the dielectric material 11. Accordingly, when the RF electrodes 12*a*, 12*b*, 12*a*', 12*b*' and dielectric material 11 are mechanically coupled together by the pin separators 13, the ends of the projecting portions 13*b* distal from the head portion 13*a* extend beyond the outer planar surface of the dielectric material 11.

Each projecting portion 13*b* of each pin separator 13 is electrically connected to an RF voltage supply to supply an RF voltage to the respective RF electrode 12*a*, 12*b*, 12*a*', 21*b*'. This connection may be provided by connectors configured to provide electrical connection to the RF voltage supply. Each connector may have an opening/recess configured to receive the respective projecting portion 13*b*. By directly connecting the pin separator 13 to the RF voltage supply instead of using tracks on the dielectric material 11, dielectric losses and heating of the dielectric material 11 may be reduced.

The connectors configured to provide electrical connection between the projecting portion 13*b* and the RF voltage supply may be, for example, wires. The wires may have spring loaded contacts on their ends to ensure reliable electrical contact. For example, the wires may have spring loaded gold-coated tubes soldered or crimped on their ends. The inner diameter of the tubes is slightly larger than the outer diameter of the ends of the wires. A small circular spring is provided within a groove inside each tube to ensure reliable cold-welded electrical contact to the wire end.

Optionally, the ends of the projecting portions 13*b* distal from the respective head portions 13*a* may also be soldered to the outer major surface of the dielectric material so that any force on the connectors does not cause bending of RF electrodes 12*a*, 12*b*, 12*a*',12*b*'.

In each electrode arrangement 10, 10', at least one DC electrode 14 is provided on the majority of the inner major surface of the dielectric material 11. In the embodiment shown in FIGS. 5 to 10, one DC electrode 14 that is segmented by grooves formed in the transverse direction is provided on each dielectric material 11. The grooves are much narrower than the segments defined between the grooves. The thickness of each groove is preferably less than 0.5 mm. The DC electrodes 14 extend from the first end 100*a* to the second end 100*b* of the electrode assembly 100 and from the first minor sidewall 101 to the second minor sidewall 102 of the electrode assembly 100 Indeed, each DC electrode 14 is provided on the entirety of the inner major surface of the dielectric material 11 extending between the first and second minor side walls 101, 102 except for the exposed portions (i.e. the portions of the inner major surface of the dielectric material 11 without a DC electrode 14 thereon).

The exposed portions prevent electrical contact between the RF electrodes 12*a*, 12*b*, 12*a*', 12*b*' and the DC electrodes 14. As best shown in FIGS. 7 to 9, each exposed portion comprises a contact area 11*b*, which is the area of the inner major surface of the dielectric material 11 that is in direct contact with the pin separator 13 when the RF electrodes 12*a*, 12*b*, 12*a*', 12*b*' are coupled to the dielectric material 11 (i.e. the area where the head portion 13*a* of the pin separator 13 contacts the inner major surface of the dielectric material 11). Each exposed portion also preferably comprises a groove 11*c* surrounding the contact area 11*b*. The groove 11*c* formed around each pin separator 13 increases tracking distance and avoids breakdown. In the specific embodiment shown in FIGS. 5 to 10, as best shown in FIGS. 8 and 9, the head portion 13*a* of the pin separator 13 is shaped as a disc contacts the inner major surface of the dielectric material 11 when the RF electrode 12*a*, 12*b*, 12*a*', 12*b*' is coupled to the dielectric material 11. Accordingly, the contact area 11*b* is circular in shape, has approximately the same diameter as the head portion 13*a* and surrounds the through-hole 11*a*.

Surrounding the contact area 11*b* is the groove 11*c* formed in the inner major surface of the dielectric material 11. The groove 11*c* is annular and of greater diameter than the head portion 13*a*.

Accordingly, the DC electrodes 14 extend over the entirety of the inner major surface of the dielectric material 11 extending between the first and second minor side walls 101, 102 except for the contact area 11*b* and the groove 11*c*. Indeed, the DC electrodes 14 are arranged directly between the outer planar surface of the RF electrode 12*a*, 12*b*, 12*a*', 12*b*' and the inner major surface of the dielectric material 11 (except for the exposed portions where the pin separators 13 are located). Indeed, the DC electrode 14 of the first electrode arrangement 10 extends directly underneath the RF electrodes 12*a*, 12*b* of the first electrode arrangement 10. The DC electrode 14 of the second electrode arrangement 10' extends directly above the RF electrodes 12*a*', 12*b*' of the second electrode arrangement 10'.

As discussed above, the pin separators 13 are configured to define a gap between the RF electrodes 12*a*, 12*b*, 12*a*', 12*b*' and the dielectric material 11. The gap is provided in the direction orthogonal to the plane of the dielectric material 11. Accordingly, a gap also extends between the outer surface of the RF electrodes 12*a*, 12*b*, 12*a*', 12*b*' and the DC electrodes 14 formed on the inner major surface of the dielectric material 11. The gap is typically defined by the height of the head portion 13*a* of the pin separators 13 and reduced by the thickness of the DC electrodes 14 arranged on the inner surface of the dielectric material 11.

Preferably in the inventive electrode arrangement the RF electrodes 12*a*, 12*b*, 12*a*', 12*b*' overhang the pin separator 13. In a particularly preferred embodiment, there is a line of sight in the direction orthogonal to the plane of the dielectric material 11 between the area of the RF electrodes 12*a*, 12*b*, 12*a*', 12*b*' overhanging the pin separator 13 and the DC electrode 14.

Manufacture and Assembly

As best shown in FIG. 10, which is a schematic diagram of a partially exploded view of the electrode assembly 100, the first electrode arrangement 10 is connected to the second electrode arrangement 10' at their major edges by connectors 103. The connectors may be, for example, nuts and bolts. The nuts may extend through the minor side walls 101, 102 provided along the major edges of the electrode assembly 100.

The through-holes 11*a* are formed through the thickness of the dielectric material 11 by a standard PCB manufacturing process. The through-holes 11*a* are formed at spaced apart positions that correspond to the locations of the pin separators 13 on the RF electrodes 12*a*, 12*b*, 12*a*', 12*b*'. Preferably, the through-holes 11*a* are equally spaced along the length of the dielectric material 11.

The DC electrodes 14 are etched onto the surface of the dielectric material 11 except for the exposed portions, which are discussed above. Voltage can be provided to the DC electrodes 14 via supply lines on the PCB formed by the dielectric material 11 and a connector 20, for example a Molex connector.

The annular groove 11*c* of each exposed portion is formed in the dielectric material 11 by laser- or mechanical cutting. The DC electrodes 14 are segmented in the transverse direction, as discussed above, by grooves formed in the dielectric material 11 by etching.

A specific DC voltage is applied to each segment of the DC electrodes 14 to control the movement of the ions through the electrode assembly, in particular in the longitudinal direction of the electrode assembly.

The head portions 13*a* of the plurality of pin separators 13 are welded to each RF electrode 12*a*, 12*b*, 12*a*', 12*b*' when the RF electrode 12*a*, 12*b*, 12*a*', 12*b*' has a first length. The pin separators 13 are positioned along the length of the RF electrodes 12*a*, 12*b*, 12*a*', 12*b*' such that they correspond to the positions of the through-holes in the dielectric material 11. Preferably, the pin separators 13 are equally spaced along the length of the RF electrodes 12*a*, 12*b*, 12*a*', 12*b*'.

Each RF electrode 12*a*, 12*b*, 12*a*', 12*b*' having a first length is coupled to the respective dielectric material 11 by the plurality of pin separators 13. As discussed above, for mechanically coupling together of each RF electrode 12*a*, 12*b*, 12*a*', 12*b*' and the respective dielectric material 11, the projecting portion 13*b* of each pin separator 13 is inserted into and retained within the corresponding through-hole 11*a* extending through the thickness of the dielectric material 11. This is best shown in FIGS. 6 and 10. Each projecting portion 13*b* is then soldered to the outer major surface of dielectric material 11. Typically, each projecting portion 13*b* is soldered to a conductive pad provided on the outer major surface of the dielectric material 11. This soldering reduces and preferably avoids bending of the RF electrodes 12*a*, 12*b*, 12*a*', 12*b*', particularly in the direction orthogonal to the plane of the dielectric material 11. The first length of the RF electrode 12*a*, 12*b*, 12*a*', 12*b*' is greater than the length of the dielectric material 11 (from the first end 100*a* to the second end 100*b* of the electrode assembly 100). Therefore, when coupled together, the RF electrodes 12*a*, 12*b*, 12*a*', 12*b*' extend beyond the dielectric material 11 (in the longitudinal direction). Preferably, the first electrode arrangement 10 is also mechanically coupled to the second electrode arrangement 10' whilst the RF electrodes 12*a*, 12*b*, 12*a*', 12*b*' have the first length, which is greater than the length of the dielectric material 11.

Once all of the RF electrodes 12*a*, 12*b*, 12*a*', 12*b*' have been mechanically coupled to the respective dielectric material 11 using the plurality of pin separators 13, and preferably once the first electrode arrangement 10 is coupled to the second electrode arrangement 10', the RF electrodes 12*a*, 12*b*, 12*a*', 12*b*' are cut to remove excess material. The RF electrodes 12*a*, 12*b*, 12*a*', 12*b*' may be re-shaped by the cutting process. In particular, the RF electrodes 12*a*, 12*b*, 12*a*', 12*b*' are cut to reduce the length of the RF electrodes 12*a*, 12*b*, 12*a*', 12*b*' from the first length to the second length. The second length of the RF electrodes 12*a*, 12*b*, 12*a*', 12*b*' is the same as the length of the dielectric material 11. All four of the RF electrodes 12*a*, 12*b*, 12*a*', 12*b*' are cut from the first length to the second length at the same time. The cutting the RF electrodes 12*a*, 12*b*, 12*a*', 12*b*' is performed by a wire-erosion process with a wire extending orthogonal to the longitudinal direction of the RF electrodes 12*a*, 12*b*, 12*a*', 12*b*'. Optionally, the wire-erosion process may be used with a wire extending parallel to the longitudinal direction to accurately reduce the width and/or re-shape the RF electrodes 12*a*, 12*b*, 12*a*', 12*b*'. By cutting the RF electrodes 12*a*, 12*b*, 12*a*', 12*b*' at the same time, once coupled to the dielectric material 11, the precision of manufacturing and assembly is increased. Indeed, this process enables manufacturing and assembly of the RF electrodes 12*a*, 12*b*, 12*a*', 12*b*' with a relative error of less than 10 μm to each other while tolerances of manufacturing PCBs are typically within the range of 50-200 μm. Therefore, this process of manufacturing and assembling the RF electrodes 12*a*, 12*b*, 12*a*', 12*b*' leads to superior mechanical precision and reduces variability between systems in which the electrode arrangements 10, 10' are employed. Furthermore, the precision of ion transmission and focussing of ions achieved using the RF electrodes 12*a*, 12*b*, 12*a*', 12*b*' is improved.

The improved cutting process for the RF electrodes 12*a*, 12*b*, 12*a*', 12*b*' is possible due to, in particular, the new arrangement by which the RF electrodes are coupled to the dielectric material. They are only positioned by the pin separators 13 and therefore the outline of the RF electrodes 12*a*, 12*b*, 12*a*', 12*b*' can be precisely reshaped, in particular when hanging over the pin separators 13.

At least one of the pin separators 13 coupled to each RF electrode 12*a*, 12*b*, 12*a*', 12*b*' is then electrically connected to an RF voltage supply such that RF voltage is supplied to the RF electrodes 12*a*, 12*b*, 12*a*', 12*b*' by the pin separators 13. Preferably, the distal end of projecting portion 13*b* of each pin separator 13 is electrically connected to the RF voltage supply. This may be achieved by soldering the distal ends of the pin separators 13 to wires configured to supply the RF voltage.

In Use

In use, an RF voltage is applied to the RF electrodes 12*a*, 12*b*, 12*a*', 12*b*' from a RF voltage supply. The RF electrodes 12*a*, 12*b*, 12*a*', 12*b*' form a multipole (in this case a quadrupole). Indeed, the RF voltage is applied such that adjacent RF electrodes 12*a*, 12*b*, 12*a*', 12*b*' of the multipole have opposite phase. Therefore, electrodes 12*a* and 12*b*' are connected as one set so that they have the same phase as each other whilst electrodes 12*b* and 12*a*' are connected as another set so that they have the same phase as each other but opposite to that of 12*a* and 12*b*'. Accordingly, the RF electrodes 12*a*, 12*b*, 12*a*', 12*b*' produce a pseudopotential well defining an ion flow path in the form of ion optical axis extending parallel to the longitudinal direction of the electrode assembly 100.

In use, a DC voltage may be applied to the DC electrodes 14. The DC voltage is applied to the DC electrode segments such that the DC electrode segments provide a DC potential that increases preferably monotonously from the first end 100*a* to the second end 100*b* of the electrode assembly. Preferably, the increasing DC potential is provided by using a resistive divider located on an outer surface of dielectric material 11, which is connected to each DC electrode segment by a connector 22 and has equal resistors. Preferably, a linear voltage distribution is defined, though more complicated and time-dependent distributions could be also employed to enable ion manipulation within the ion electrode assembly. For example, ions could be driven to either the first end 100*a* or the second end 100*b* of the electrode assembly 100 in synchronization with further stages of mass analysis. Also, ion mobility separation in gas-filled guide could be enabled. This can be accomplished when the drift velocity is provided by a DC gradient on the electrode assembly. Preferably the RF electrodes 12*a*, 12*b*, 12*a*', 12*b*' may be split into multiple segments, each having its own DC voltage applied thereto. The DC voltage may be supplied by, for example, the same resistive divider as that used to supply the DC electrode segments). By splitting the RF electrodes 12*a*, 12*b*, 12*a*', 12*b*' into multiple segments, each having its own DC voltage applied thereto, in addition to the DC electrode segments, enables generation of stronger axial gradients in the electrode assembly.

Figure 10A:
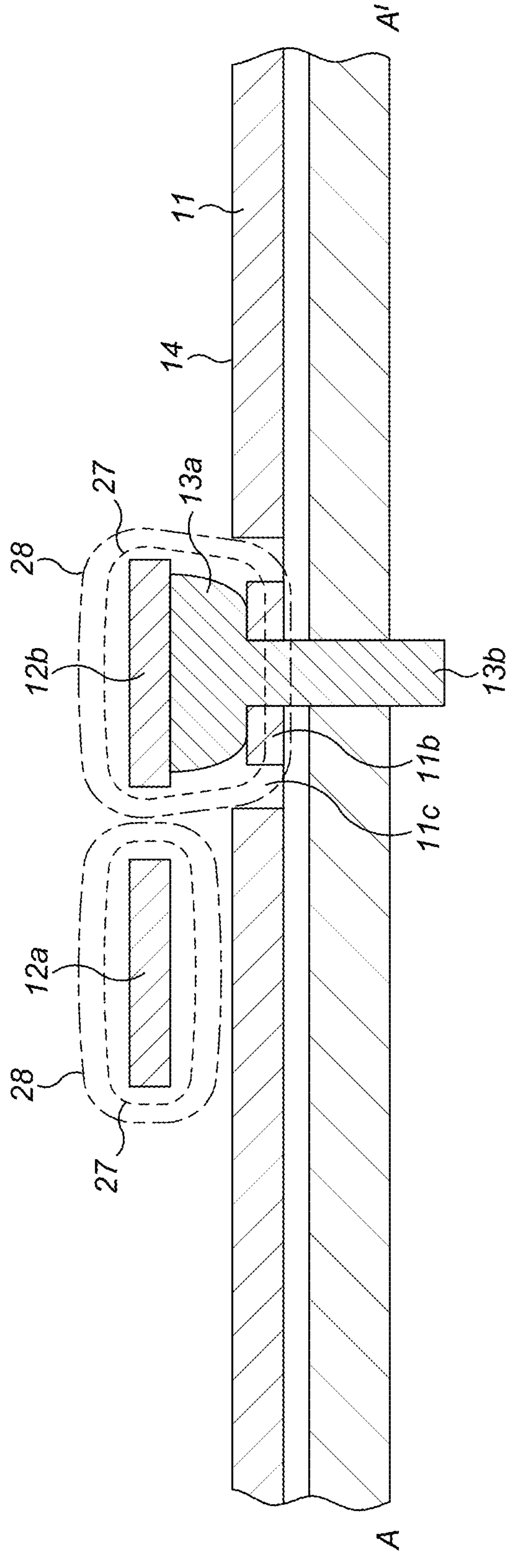
FIG. 10*a* shows a cross-section of the electrode assembly of FIGS. 5 to 10 along the line AA' shown in FIG. 10.
Figure 10B:
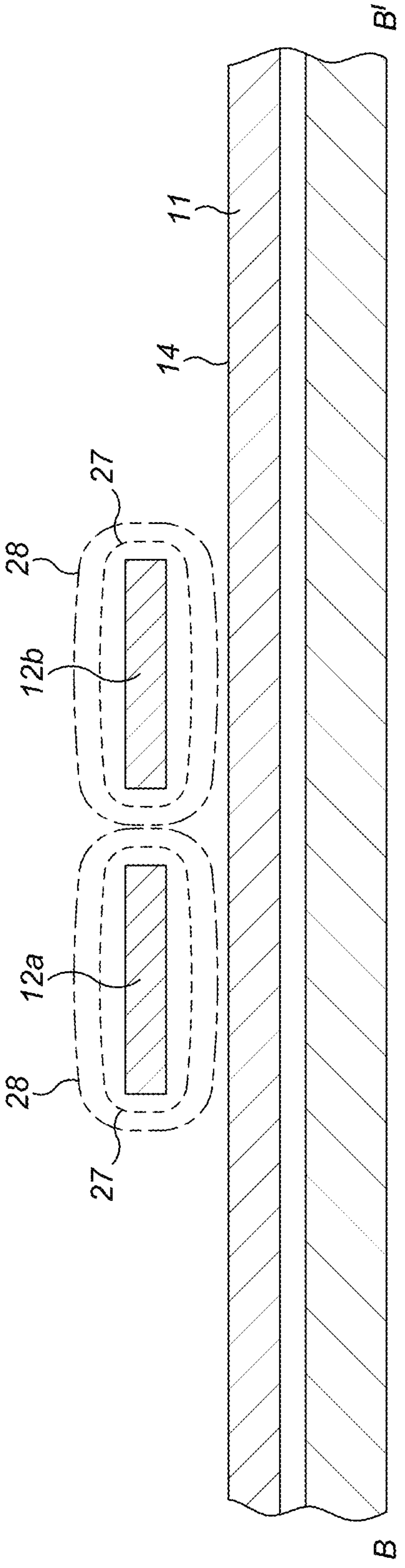
FIG. 10*b* shows a cross-section of the electrode assembly of FIGS. 5 to 10 along the line BB' shown in FIG. 10.

FIGS. 10*a* and 10*b* show cross-sections of the electrode assembly of FIGS. 5 to 10 along the lines AA' and BB' shown in FIG. 10. FIGS. 10*a* and 10*b* also show, as dashed lines, the equipotential 27 of 75% of the RF voltage applied to the RF electrodes 12*a* and 12*b* and the equi-potential 28 of 25% of the RF voltage applied to the RF electrodes 12*a* and 12*b*.

The gap between the RF electrode 12*a*, 12*b*, 12*a*', 12*b*' and the dielectric material 11 enables the DC electrode 14 provided directly therebetween to shield the dielectric material 11 from the RF field generated by the RF electrode 12*a*, 12*b*, 12*a*', 12*b*'. This shielding prevents the RF field from penetrating the dielectric material 11, as shown by the equipotential lines 27, 28 in FIG. 10*b*, and so prevents generation of heat within the dielectric material 11 by dielectric loss. The only penetration of the RF field into the dielectric material 11 occurs at the exposed areas (the exposed areas include the contact area 11*b* between each pin separator 13 and the dielectric material 11, the groove 11*c* surrounding the contact area 11*b* (as shown in FIG. 10*a* for the electrode 12*b*) and the grooves between the segments of each DC electrode 14). In the present invention, the exposed areas have been minimised by providing a plurality of separators at spaced apart positions along the length of the RF electrode 12*a*, 12*b*, 12*a*', 12*b*'.

Figure 1:
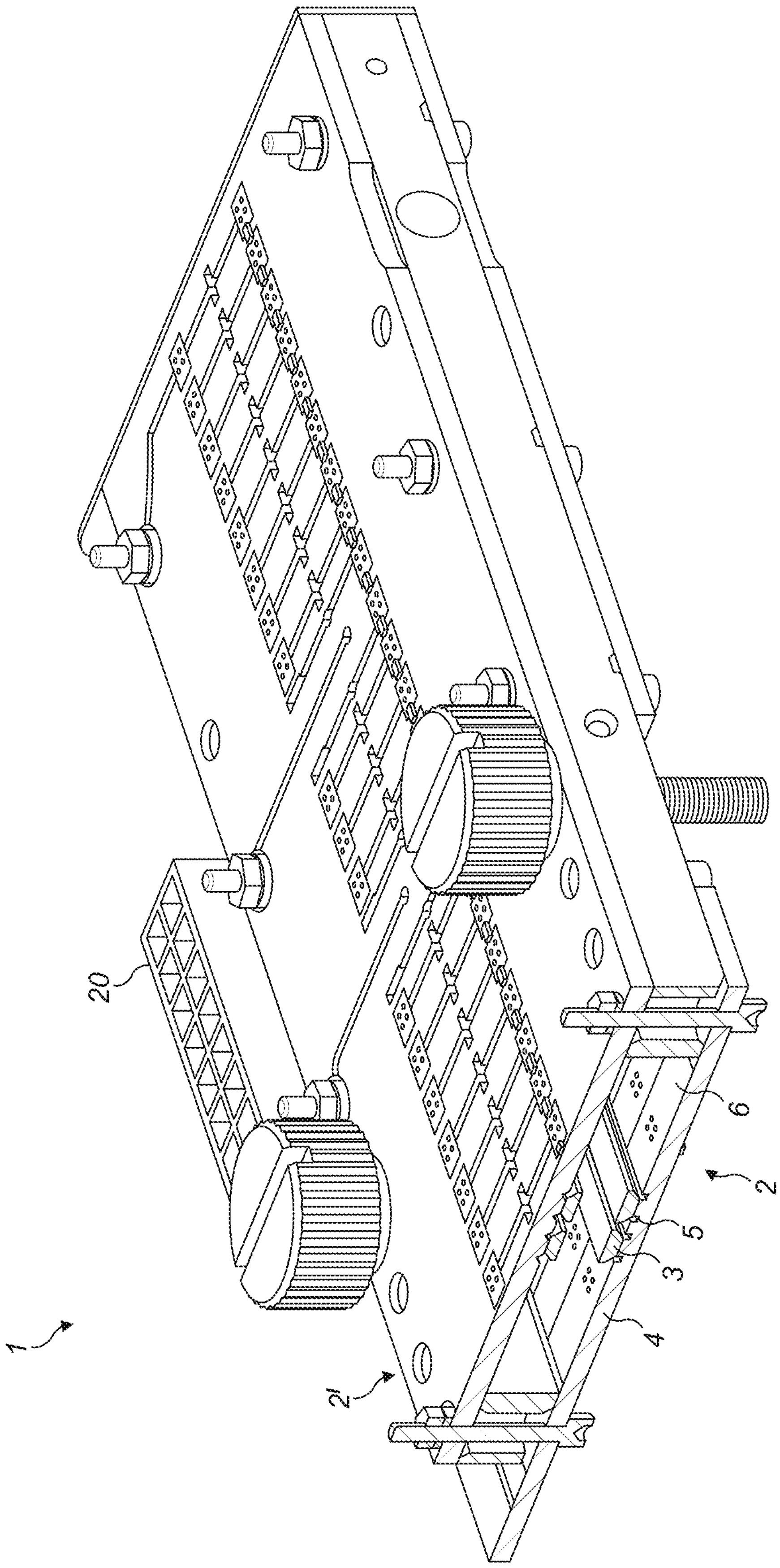
FIG. 1 is a schematic diagram of a known electrode assembly, the known electrode assembly having first and second known electrode arrangements.
Figure 1A:
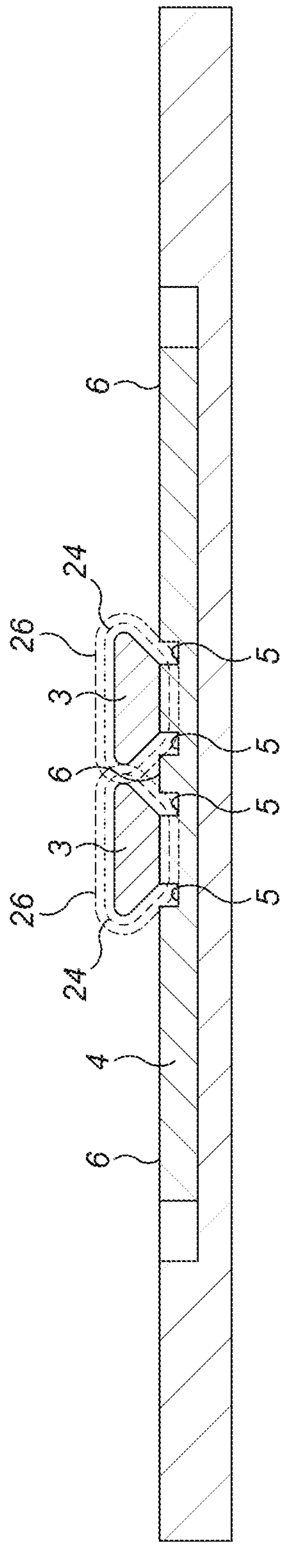
FIG. 1*a* shows a cross-section of the known electrode assembly of FIG. 1

This is significantly different from the known electrode assembly 1 shown in FIGS. 1 and 1*a*. FIG. 1*a* also shows, as dashed lines, the equi-potential 24 of 75% of the RF voltage applied to the RF electrodes 3 and the equi-potential 26 of 25% of the RF voltage applied to the RF electrodes 3. In this known electrode assembly 1, the RF field penetrates the dielectric material 4 underneath/above the RF electrodes along the entire length of the RF electrodes 3. The penetration of the RF field is therefore over a larger area of the dielectric material 4 of the known electrode assembly 1 compared to the penetration of the RF field in the electrode assembly of the claimed invention. The penetration of the RF field over a greater area in the known electrode assembly 1 causes greater heating of the dielectric material 4.

The electrode arrangements 10, 10' of the present invention, as shown in FIGS. 5 to 10, may be employed in reaction cells, in particular collision cells or fragmentation cells employing methods such as collision induced dissociation (CID), electron capture dissociation (ECD), electron transfer dissociation (ETD), photodissociation, and so forth. For ETD, the RF electrodes 12*a*, 12*b*, 12*a*' and 12*b*' could be segmented into longitudinal segments by grooves formed in the longitudinal direction. The longitudinal segments may have independently controlled DC offsets and RF voltages applied thereto, as is known in the art, e.g. in U.S. Pat. No. 7,145,139.

The electrode arrangements 10, 10' of the present invention, as shown in FIGS. 5 to 10 may be employed in an ion guide, an ion filter such as a quadrupole mass filter, an ion mobility spectrometer, an ion trap such as a linear ion trap, an ion storage device or ion analyser such as a mass analyser. Indeed, the electrode arrangements 10, 10' may be used in any devices that generate an RF multipole using planar RF electrodes connected to dielectric materials. The use of RF electrodes in ion traps, ion guides, ion filters, reaction cells, ion storage devices and ion analysers would be well understood by the skilled person.

In a preferred embodiment, the electrode assembly 100 having the electrode arrangements 10, 10', as depicted in FIGS. 5 to 10, is employed in a collision cell, such as a HCD (Higher-energy collisional dissociation) cell. A collision cell is typically arranged in the ion path of a mass spectrometer, such as a mass spectrometer comprising a quadrupole and an Orbitrap mass analyser. When the electrode assembly 100 is arranged in a collision cell, the electrode assembly 100 additionally has third and fourth minor side walls at the first and second ends 100*a*, 100*b* of the electrode assembly 100. An opening is provided in the third minor side wall at the first end 100*a* of the electrode assembly 100 and, optionally, also an opening is provided in the fourth minor side wall at the second end 100*b* of the electrode assembly 100. In use, ions, referred to as precursor ions, enter the electrode assembly 100 via the opening at the first end 100*a* into the space between the first and second electrode arrangements 10, 10'. The space may be filled with nitrogen, argon, or other suitable collision gas for collisional cooling and/or fragmentation of ions. If fragmentation is desired, then the precursor ions are accelerated into the collision cell at a desired collision energy by adjusting the DC voltage applied to the DC electrodes in order to adjust the DC offset between the collision cell and components upstream of the collision cell. Alternatively, if the precursor ions are to remain intact, the DC offsets are adjusted to maintain the energies of the entering ions to a level at which no or minimal fragmentation occurs. The precursor ions/fragments may then exit the electrode assembly 100 via the opening at the second end 100*b*. Alternatively, the collision cell having the electrode assembly 100 may have a "dead end" configuration. In such a configuration, there is no opening at the second end 100*b* and the precursor/fragment ions exit the electrode assembly 100 via the opening at the first end 100*a*.

When the electrode assembly 100 having the first and second electrode arrangements 10, 10', as depicted in FIGS. 5 to 10, is instead employed in an ion guide, such as a bent flatapol, ions enter the electrode assembly 100 via the first end 100*a* and are confined within the electrode assembly 100 to travel along the longitudinal axis. The DC electrode 14 may be configured to produce a DC electric field that drives ions along the longitudinal direction through the electrode assembly 100. The ions then exit the ion guide via the second end 100*b*.

Figure 15:
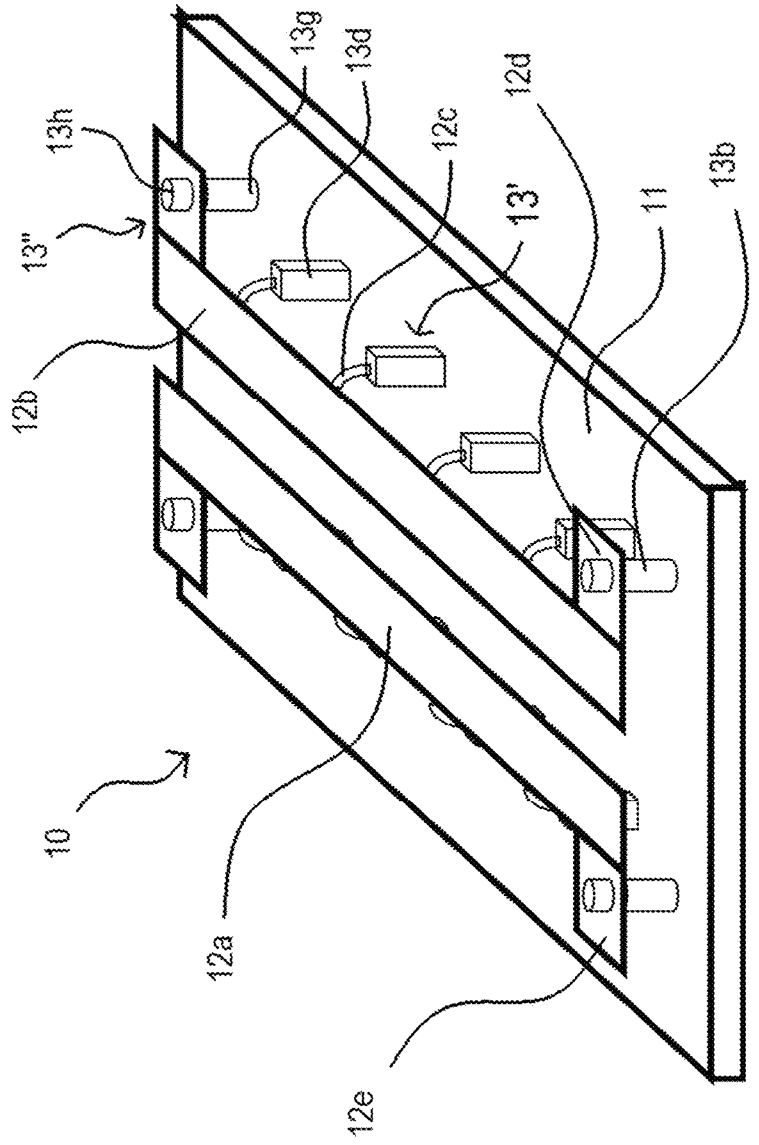
FIG. 15 is a schematic diagram of a second embodiment of the first electrode arrangement.
Figure 16:
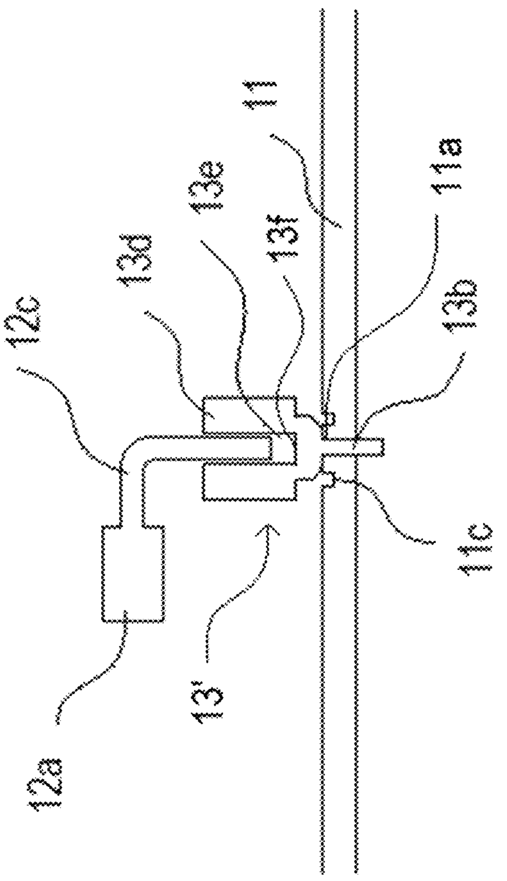
FIG. 16 is a schematic diagram of a portion of a longitudinal cross-section of the first electrode arrangement of FIG. 15 in accordance with the second embodiment of the present invention.

FIGS. 15 and 16 show a second embodiment of the first electrode arrangement 10 of the present invention. Although only the first electrode arrangement 10 has been shown, it will be appreciated that the second electrode arrangement 10' may be similarly configured. The difference between the second embodiment shown in FIGS. 15 and 16 and the first embodiment shown in FIGS. 5 to 10 is that the second embodiment comprises receptacled separators 13' and projecting separators 13" instead of pin separators 13. Receptacled separators 13' are shown in further detail in FIG. 16.

The difference between the receptacled separators 13' and the pin separators 13 is that for receptacled separators 13', each head portion 13*a* comprises a receptacle 13*d* for receiving a protruding portion 12*c* extending from the main body of the RF electrodes 12*a*, 12*b*, 12*a'*, 12*b'*. The description of the other components of FIGS. 5 to 10 equally apply to the equivalent components of FIGS. 15 and 16 which are labelled with the same reference numbers. The description of the projecting portion 13*b* of the pin separator 13 in respect of FIGS. 5 to 10 equally applies to the projecting portion 13*b* of the receptacled separator 13' of FIGS. 15 and 16.

The receptacled separators 13' are mechanically coupled to the RF electrodes 12*a*, 12*b*,12*a'*, 12*b'*. The RF electrodes 12*a*, 12*b*, 12*a'*, 12*b'* each have a main body, which is elongate and extends in the longitudinal direction of the electrode assembly 10. The main body of the RF electrodes 12*a*, 12*b*, 12*a'*, 12*b'* comprises the major and minor surfaces described above. As described above, the major surfaces of the RF electrodes 12*a*, 12*b*, 12*a'*, 12*b'* are parallel to the plane of the dielectric surface 11. The minor surfaces of the RF electrodes 12*a*, 12*b*, 12*a'*, 12*b'* are orthogonal to the planar dielectric surface 11. In the second embodiment, the RF electrodes 12*a*, 12*b*, 12*a'*, 12*b'* comprise the main body and a plurality of protruding portions 12*c* extending from the main body. Each protruding portion 12*c* is received by the respective receptacle 13*d*. Each protruding portion 12*c* of each RF electrode 12*a*, 12*b*, 12*a'*, 12*b'* is inserted into and retained within the corresponding receptacle 13*d* of the receptacled separator 13'.

Each receptacle 13*d* comprises an opening 13*e* for receiving the protruding portion 12*c*. The opening 13*e* may have a complementary shape to the corresponding protruding portion 12*c*. The opening 13*e* may be a through-hole or may instead be a recess that only extends partially through the receptacle 13*d*. The receptacle 13*d* and its opening 13*e* have a longitudinal axis extending in the direction orthogonal to the plane of the dielectric material 11. The opening 13*e* extends in the direction orthogonal to the plane of the RF electrodes 12*a*, 12*b*, 12*a'*, 12*b'*. The diameter of the opening 13*e* formed in the receptacle 13*d* may be the same or greater than the diameter of the protruding portion 12*c* of the RF electrode 12*a*, 12*b*, 12*a'*, 12*b'*. Preferably, the receptacle comprises a circular spring (not shown) that exerts a retaining force on the protruding portion 12*c* to retain the protruding portion 12*c* in the opening 13*e* of the receptacle 13*d*. The receptacle 13*d* may provide mechanical support and alignment for the RF electrodes 12*a*, 12*b*, 12*a'*, 12*b'*.

As discussed above in respect of the pin separators 13, the receptacled separators 13' are configured to define a gap between the RF electrodes 12*a*, 12*b*, 12*a'*, 12*b'* and the dielectric material 11. The gap is provided in the direction orthogonal to the plane of the dielectric material 11. Accordingly, a gap also extends between the outer (major) surface of the RF electrodes 12*a*, 12*b*, 12*a'*, 12*b'* and the DC electrodes 14 formed on the inner (major) surface of the dielectric material 11. This is discussed in further detail above in respect of the pin separators 13 in the embodiment shown in FIGS. 5 to 10 and equally applies to the receptacled separators 13' of the embodiment shown in FIGS. 15 and 16.

Each protruding portion 12*c* preferably only partially extends into the opening 13*e* such that a gap is formed between the bottom wall 13*f* of the receptacle 13*d* and the end of the protruding portion 12*c* distal from the main body of the respective RF electrode 12*a*, 12*b*, 12*a'*, 12*b'*. This gap is provided along the longitudinal axis of the receptacle (i.e. orthogonal to the plane of the RF electrodes 12*a*, 12*b*, 12*a'*, 12*b'*). By inserting the protruding portion 12*c* into the opening 13*e* in the receptacle 13*d*, vibrations or bending of electrodes is avoided.

The protruding portions 12*c* are preferably integrally formed with and are part of the RF electrodes 12*a*, 12*b*, 12*a'*, 12*b'*. Each protruding portion 12*c* extends from the minor surface of the main body of the respective RF electrode 12*a*, 12*b*, 12*a'*, 12*b'*. Each protruding portion 12*c* connects the minor surface of the RF electrode 12*a*, 12*b*, 12*a'*, 12*b'* to the separator 13. Each protruding portion 12*c* has a first section in a first plane and a second section in a second plane. The first plane is the plane of the main body of the RF electrodes 12*a*, 12*b*, 12*a'*, 12*b'* i.e. the first section extends in the plane of the RF electrodes 12*a*, 12*b*, 12*a'*, 12*b'*. The first section extends in a direction away from the main body of the respective RF electrode 12*a*, 12*b*, 12*a'*, 12*b'* (i.e. in a direction at a non-zero angle to the longitudinal axis of the RF electrode 12*a*, 12*b*, 12*a'*, 12*b'*). Most preferably, the first section extends in the plane of the RF electrode 12*a*, 12*b*, 12*a'*, 12*b'* in a direction perpendicular to the longitudinal axis of the RF electrode 12*a*, 12*b*, 12*a'*, 12*b'*. At least a part of the second section is received within the receptacle 13*d*. The second section extends at an angle to the plane of the RF electrode 12*a*, 12*b*, 12*a'*, 12*b'* (i.e. the second section extends out of the plane of the RF electrode 12*a*, 12*b*, 12*a*', 12*b*') such that it enters the receptacle 13*d*. The second plane is at an angle relative to the first plane. In a preferred embodiment, the second plane is orthogonal to the first plane. Preferably, each protruding portion has a curved section connecting the first and second sections and so transitioning the protruding portion from the first plane to the second plane. However, in an alternative arrangement, the protruding portion 12*c* may not have a curved section and instead, the first section may be directly connected to the second section such that the first section intersects the second section at a non-zero angle.

The description of the projecting portions 13*b* of the pin separators 13 above in respect of the embodiment shown in FIGS. 5 to 10 equally applies to the projecting portions 13*b* for the receptacled separators 13' in the second embodiment shown in FIGS. 15 and 16. Indeed, in FIGS. 15 and 16, each projecting portion 13*b* extends from the head portion 13*a* in a direction orthogonal to the plane of the RF electrode 12*a*, 12*b*, 12*a*', 12*b*' and orthogonal to the plane of the dielectric material 11. Each projecting portion 13*b* is received and retained in the corresponding receiving portion 11*a* of the dielectric material 11 as discussed in detail above.

Each protruding portion 12*c* of the RF electrode 12*a*, 12*b*, 12*a*', 12*b*' is formed integrally with the RF electrode 12*a*, 12*b*, 12*a*', 12*b*' and so has been described as a part of the RF electrode 12*a*, 12*b*, 12*a*', 12*b*'. Preferably, RF electrodes 12 are made as flat plates e.g. by laser cutting or pressing and then protruding portion 12*c* is bent downwards from the flat plate on a special jig. In this case, cross-section of the protruding portion 12*c* is typically square Alternatively and less preferably, the protruding portion 12*c* may be attached to the RF electrode 12*a*, 12*b*, 12*a*', 12*b*' by laser- or electron-beam welding rather than being formed integrally with the RF electrode 12*a*, 12*b*, 12*a*', 12*b*'.

The receptacle 13*d* is illustrated as having a square cross section and its opening 13*e* has a circular cross section. Of course it will be appreciated that other shapes may be employed. For example, the receptacle 13*d* may have a cylindrical cross section and its opening 13*e* may have a square cross section. Of course, the cross-section of the protruding portion 12*c* may also have a different shape from the square shape shown in FIGS. 15 and 16.

As discussed above, the receptacled separators 13' are offset from the RF electrodes 12*a*, 12*b*, 12*a*', 12*b*' so that there is no overlap between the major surfaces of the RF electrodes 12*a*, 12*b*, 12*a*', 12*b*' and the receptacled separators 13'. The receptacled separators 13' may instead be offset such that there is some overlap between the major surface of the RF electrodes 12*a*, 12*b*, 12*a*', 12*b*' and the receptacled separators 13'.

The receptacled separators 13' are shown to be arranged on the same side of the respective RF electrode 12*a*, 12*b*, 12*a*', 12*b*'. Instead, the receptacled separators 13' may be arranged on either side of the RF electrodes 12*a*, 12*b*, 12*a*', 12*b*'.

The protruding portions 12*c* are shown as having first and second sections and are preferably manufactured from flat sheet. Instead, each protruding portions 12*c* may extend from the RF electrode 12*a*, 12*b*, 12*a*', 12*b*' in the plane of the RF electrode at an angle to the longitudinal axis of the RF electrode. The protruding portions 12*c* may be linear. In one arrangement, each receptacle 13*d* may extend in the plane of the RF electrode 12*a*, 12*b*, 12*a*', 12*b*' at an angle to the longitudinal axis of the RF electrode such that the protruding portion 12*c*, which is linear, is received within the receptacle 13*d*. The projecting portion 13*b* may have a first part that extends in the plane of the RF electrode and is connected to the receptacle 13*d* and a second part that extends at an angle to the plane of the RF electrode and is received within the receiving portion 11*a* of the dielectric material 11. The first and second parts may be connected by a curved part. The second part may extend in the direction out of the plane of the RF electrode 12*a*, 12*b*, 12*a*', 12*b*', preferably orthogonal to the plane of the RF electrode 12*a*, 12*b*, 12*a*', 12*b*'. Alternatively, each protruding portion 12*c* may extend from the major surface of the RF electrode 12*a*, 12*b*, 12*a*',12*b*' in the direction out of the plane of the RF electrodes 12*a*, 12*b*, 12*a*', 12*b*' and into the receptacle 13*d*. In this arrangement, the receptacle separators 13' may be positioned in-line with or proximal to the central longitudinal axis of the RF electrodes 12*a*, 12*b*, 12*a*',12*b*'.

In this second embodiment, optionally a plurality of projecting separators 13" are also provided in addition to the receptacled separators 13'. The plurality of projecting separators 13" are spaced apart from each other. The plurality of projecting separators 13" may be positioned at a plurality of points along the RF electrode 12*a*, 12*b*, 12*a*', 12*b*', preferably two or three points, as shown in FIG. 15, where they are positioned at two points along the RF electrode 12*a*, 12*b*, 12*a*', 12*b*'.

Similarly to pin separators 13 and receptacled separators 13', projecting separators 13" may define the gap between the RF electrode(s) 12*a*, 12*b*, 12*a*', 12*b*' and the dielectric material 11. Each projecting separators 13" connect the major planar surface of the RF electrode 12*a*, 12*b*, 12*a*', 12*b*' to the dielectric material 11. Projecting Separators 13" differ from the pin separators 13 of the embodiment shown in FIGS. 5 to 10 in that each projecting separator 13" does not have a head portion 13*a* of greater diameter than a projecting portion 13*b*. Instead, each projecting separator 13" is formed of the projecting portion 13*b* that extends between a first end 13*g* and a second end 13*h* along a longitudinal axis of the separator 13" i.e. in a direction orthogonal to the major planar surface of the dielectric material 11 and the major planar surface of the RF electrodes 12*a*, 12*b*, 12*a*', 12*b*'. The first end 13*g* of the projecting portion 13*b* is received within the corresponding receiving portion 11*a* in the dielectric material 11. The second end 13*h* of the projecting portion 13*b* is received within an opening 12*d* in the RF electrode 12*a*, 12*b*, 12*a*', 12*b*'. Accordingly, the projecting separator 13" extends between the inner surface of the dielectric material 11 and the RF electrode 12*a*, 12*b*, 12*a*', 12*b*' in the direction orthogonal to the plane of the dielectric material 11. The projecting portion 13*b* is cylindrical and having a circular cross-section. However, other cross-sectional shapes may be employed, such as square.

Each receiving portion 11*a* in the dielectric material 11 and each opening 12*d* in the RF electrode 12*a*, 12*b*, 12*a*', 12*b*' may have complementary shapes to the first end 13*g* and second end 13*h* of the projecting portion 13*b*. Each receiving portion 11*a* and/or each opening 12*d* may be a through-hole or may instead be a recess. Preferably, the receiving portion 11*a* is a through-hole and the first end 13*g* of the projecting portion 13*b* extends through the receiving portion 11*a* such that the first end 13*g* extends beyond the outer surface of the dielectric material 11. Preferably, the opening 12*d* in the RF electrode 12*a*, 12*b*, 12*a*', 12*b*' is a through-hole and the second end 13*h* of the projecting portion 13*b* extends through the opening 12*d* in the RF electrode such that the second end 13*h* extends beyond the inner surface of the RF electrode 12*a*, 12*b*, 12*a*', 12*b*'.

Each receiving portion 11*a* in the dielectric material and each opening 12*d* in the RF electrode 12*a*, 12*b*, 12*a*', 12*b*' may be machined, punched or laser-cut. The first end 13_g_ and second end 13_h_ of the projecting separators 13" may be fastened to the dielectric material 11 and RF electrodes 12_a_,12_b_,12_a_',12_b_', respectively, for example, by nuts and screws, circular clips, soldering, adhesive or welding. As discussed, above, each projecting portion 13_b_ may be soldered to the outer major surface of dielectric material 11. Typically, each projecting portion 13_b_ is soldered to a conductive pad provided on the outer major surface of the dielectric material 11. Each projecting portion 13_b_ of the projecting separators 13" may also be soldered to the inner major surface of the RF electrode 12_a_, 12_b_, 12_a_', 12_b_'.

As shown in FIG. 15, the projecting separators 13" are preferably mechanically coupled to one or more end portion(s) 12_e_ of the RF electrodes. The openings 12_d_ discussed above may be formed in the one or more end portion(s) 12_e_ for receiving the second end 13_h_ of each projecting portion 13_b_. Each end portion 12_e_ is planar and has a major planar surface parallel to and opposing the dielectric material 11. As discussed above, the main body of the RF electrodes 12_a_, 12_b_, 12_a_', 12_b_' is elongate and extends in the longitudinal direction of the electrode assembly. Preferably each end portion 12_e_ extends in the plane of and laterally from the main body of the RF electrodes 12_a_, 12_b_, 12_a_', 12_b_'. More preferably, each end portion 12_e_ extends in the plane of the main body of the RF electrodes 12_a_, 12_b_, 12_a_', 12_b_' and perpendicular from the longitudinal axis of the main body of the RF electrodes 12_a_, 12_b_, 12_a_',12_b_'. Therefore, the projecting separators 13" are offset from and do no overlap with the main body of the RF electrodes 12_a_, 12_b_, 12_a_',12_b_'. In other words, the projecting separators 13" are offset from and do not overlap with the major surfaces of the RF electrodes 12_a_, 12_b_, 12_a_',12_b_' extending along the longitudinal direction of the electrode assembly 10.

In the embodiment shown in FIG. 15, a first projecting separator 13" is mechanically coupled to a first end portion 12_e_ and a second projecting separator 13" is mechanically to a second end portion 12_e_ of the RF electrode 12_a_, 12_b_, 12_a_',12_b_'. Preferably the first end portion 12_e_ is spaced apart from the second end portion 12_e_ along the longitudinal direction of the electrode assembly 10.

As discussed above in respect of the projecting portion 13_b_ of the pin separators, the first end 13_g_ of the projecting portion 13_b_ of the projecting separators 13" may be electrically connected to an RF voltage supply to supply an RF voltage to the respective RF electrode 12_a_, 12_b_, 12_a_', 21_b_'. This connection may be provided by connectors configured to provide electrical connection to the RF voltage supply. The connectors have been discussed above.

As discussed above, the inclusion of the projecting separators 13" in addition to the receptacled separators 13' is optional. Similarly, the inclusion of the receptacled separators 13' in addition to the projecting separators 13" is optional. In FIG. 15, both receptacled separators 13' and projecting separators 13" are present. By providing both receptacled separators 13' and projecting separators 13", the size of the gap between each RF electrode 12_a_, 12_b_, 12_a_', 12_b_' and the inner surface of the dielectric material 11 can be more accurately defined and maintained. If both receptacled separators 13' and projecting separators 13" are present, then the projecting separators 13" may define the gap between the RF electrode 12_a_, 12_b_,12_a_', 12_b_' by virtue of the distance between the first end 13_g_ and second end 13_h_ (i.e. the height of the separator 13"). The receptacled separators 13' may maintain relative alignment of the RF electrodes 12_a_, 12_b_, 12_a_', 12_b_' and the dielectric material 11 and prevent vibrations or bending of the RF electrodes 12_a_, 12_b_, 12_a_', 12_b_', as discussed above. The thickness of a bottom wall 13_f_ of the receptacle 13_d_ of each receptacled separator 13' may be selected to allow adjustment of the gap. Movement of the electrodes 12_a_, 12_b_, 12_a_',12_b_' due to large forces, e.g. during transport may be limited by abutment of the protruding portion 12_c_ and the bottom wall 13_f_ of the receptacle.

Although not shown in FIGS. 15 to 16, in the second embodiment at least one DC electrode 14 is provided on the majority of the inner major surface of the dielectric material similarly to FIG. 5 to 10. The description of the DC electrode(s) 14 above in relation to FIGS. 5 to 10 equally apply to FIGS. 15 and 16.

In the embodiment shown in FIGS. 15 and 16, all of the planar surface of dielectric material 11 opposing the major surface of the RF electrode extending parallel to the longitudinal direction of the electrode assembly could be covered with DC electrodes 14. Typically, coverage up to 90-95% of the surface of dielectric 11 could be achieved. In the embodiment shown in FIGS. 15 and 16, there is a line of sight in the direction orthogonal to the plane of the dielectric material 11 between all of the major surface of the RF electrode extending parallel to the longitudinal axis of the electrode assembly and the DC electrode(s) 14 on the dielectric material 11. In other words, there is no overlap between the major surfaces of the RF electrodes 12_a_, 12_b_, 12_a_', 12_b_' extending parallel to the longitudinal axis of the electrode assembly and the receptacled or projecting separators 13', 13". The entire major (planar) surface of the electrodes 12_a_, 12_b_, 12_a_', 12_b_' extending parallel to the longitudinal axis of the electrode assembly overhang the receptacled separators 13'. Therefore, greater than 90% of the surface area of the major (planar) surface of the RF electrodes 12_a_, 12_b_, 12_a_', 12_b_' extending parallel to the longitudinal axis of the electrode can be shielded from the dielectric material by the DC electrode(s) 14.

As discussed above in respect of pin separators 13, the receptacled separators 13' and projecting separators 13" may also be electrically conductive and preferably metallic. The receptacled separators 13' and projecting separators 13" are spaced apart along a surface of the dielectric material 11 and are preferably equally spaced apart. The receptacled separators 13' and projecting separators 13" may typically be formed of copper or the same material as RF electrodes 12_a_, 12_b_, 12_a_', 12_b_'. The receptacled separators 13' and projecting separators 13" may not be permanently attached to the surface of the RF electrode 12_a_, 12_b_, 12_a_', 12_b_'. For example, for the receptacled separator 13', the protruding portion of the RF electrode 12_a_, 12_b_, 12_a_', 12_b_' may be removably received in the receptacle 13_d_. For the projecting separator 13", the projecting portion 13_b_ may be removably received within the opening 12_d_.

The description of use of the electrode assembly 1 comprising the electrode arrangement 10 of the first embodiment shown in FIGS. 5 to 10 equally applies to the electrode assembly having the electrode arrangement of the second embodiment shown in FIGS. 15 and 16.

The manufacturing and assembly of the electrode assembly 1, which involves mechanically coupling the RF electrode to the dielectric material using the plurality of separators that are spaced apart such that a gap is defined between the RF electrode and the dielectric material and then cutting the RF electrode while the RF electrode is coupled to the dielectric material so as to reshape the RF electrode applies to both the embodiments shown in FIGS. 5 to 10 and FIGS. 15 and 16.

Experimental Results

Figure 2:
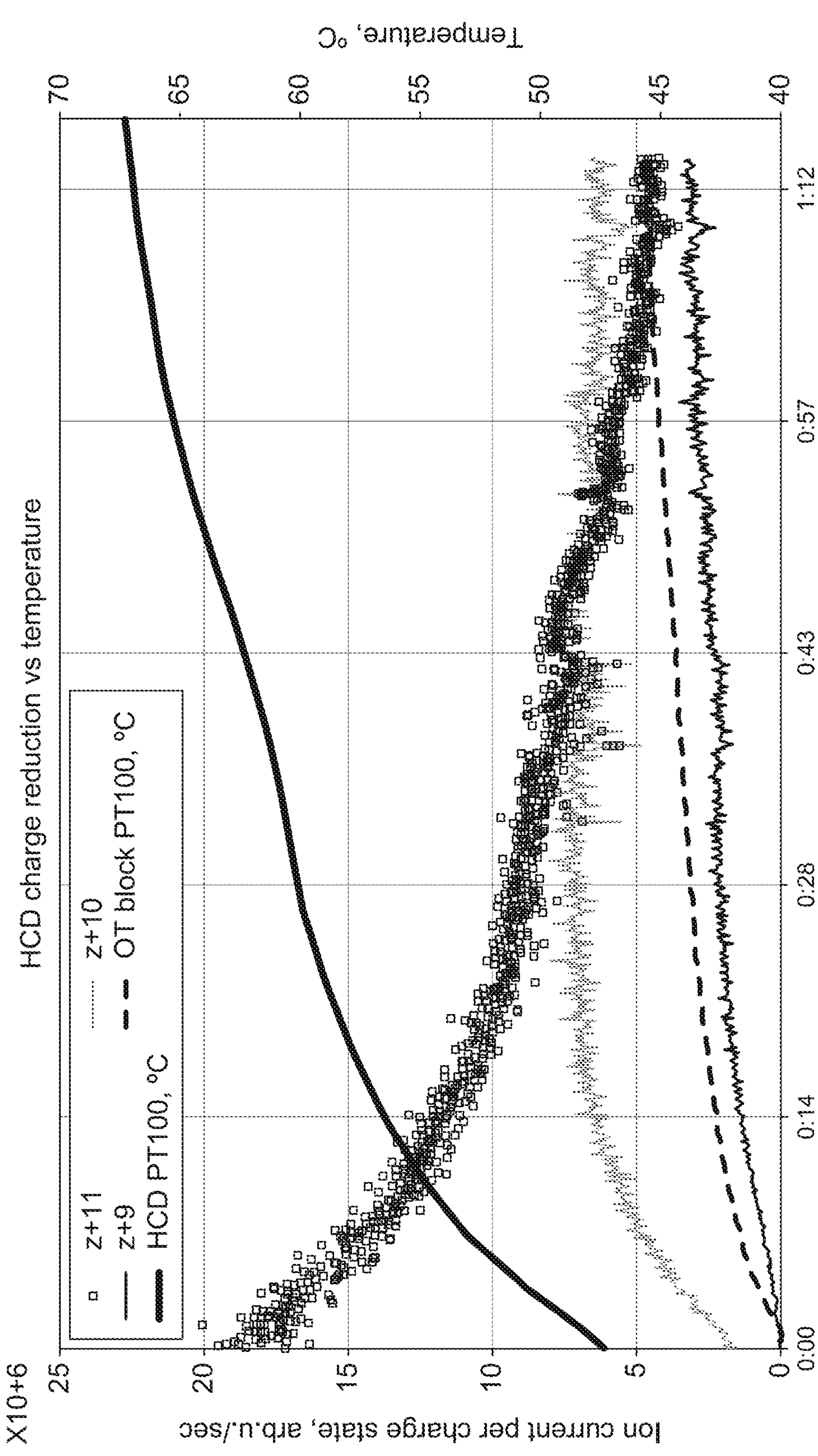
FIG. 2 is a graph of extracted ion current per charge state and temperature of a HCD cell having the electrode assembly of FIG. 1 against time over the course of experiment 1.
Figure 3A:
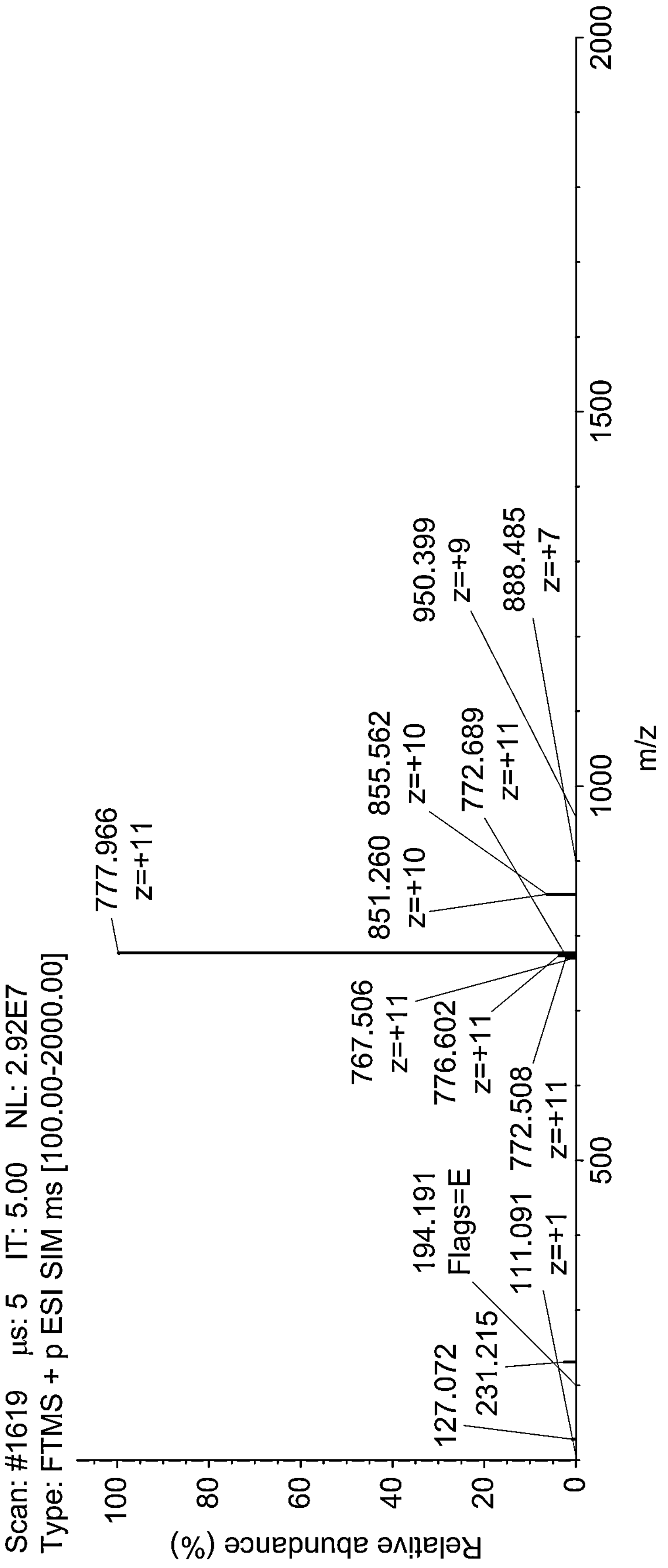
FIG. 3(*a*) is a mass spectrum acquired at the start of experiment 1 (at time 0:00).
Figure 3B:
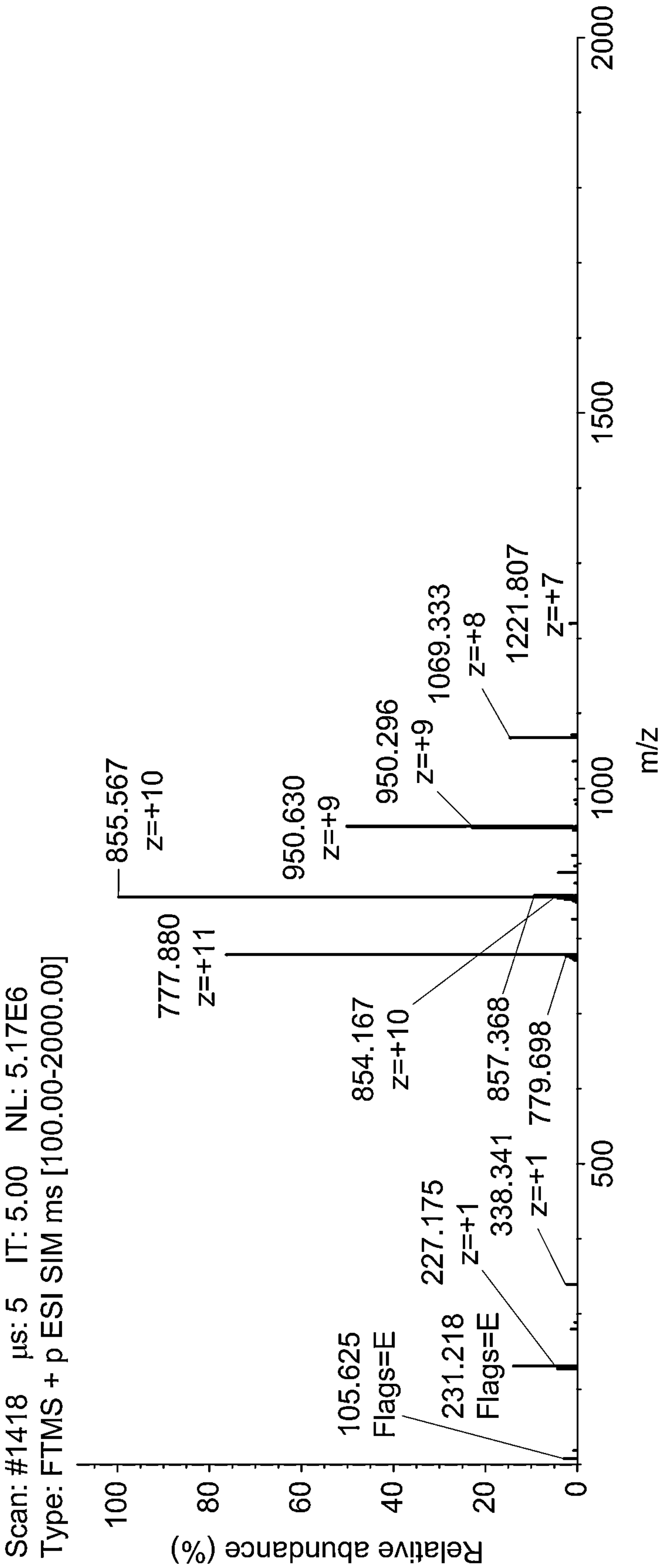
Figure 4:
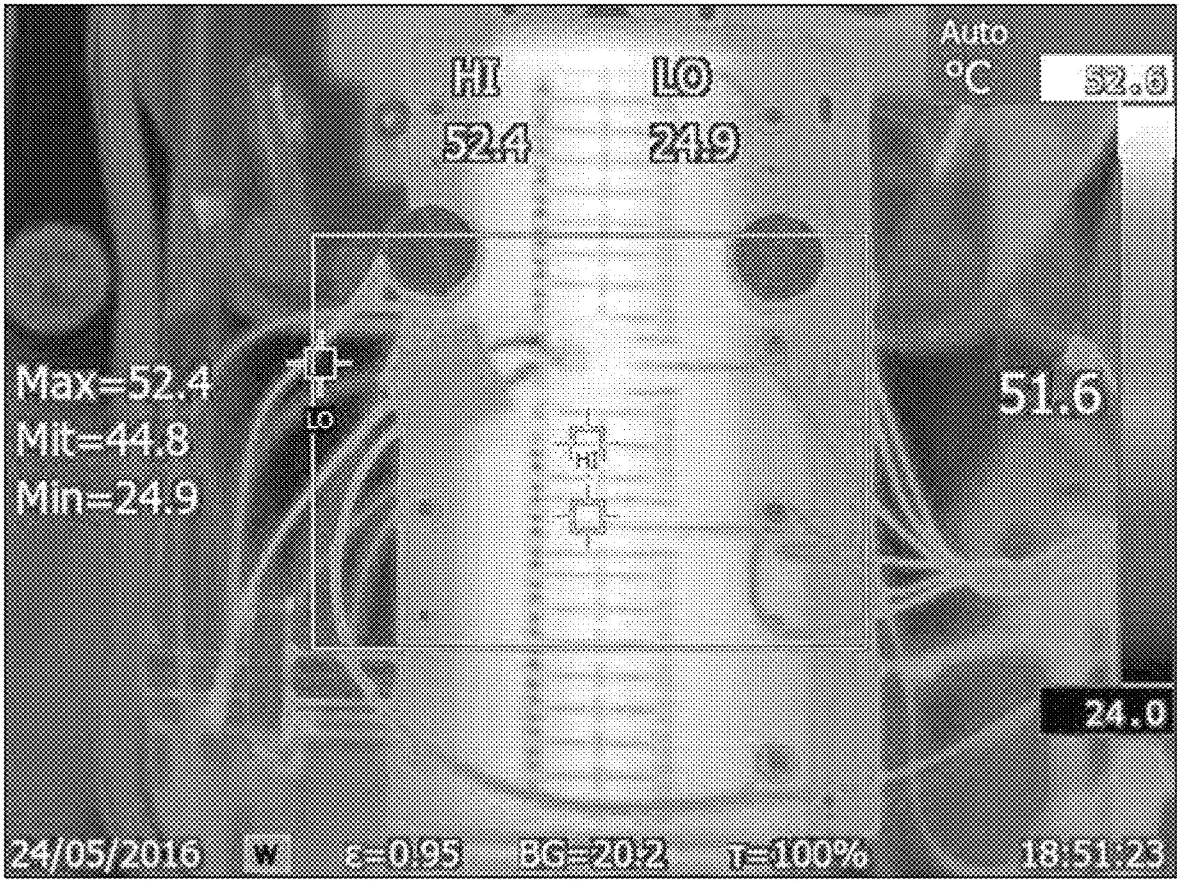
FIG. 4 is an infrared photograph of a HCD cell having the electrode assembly of FIG. 1.
Figure 11:
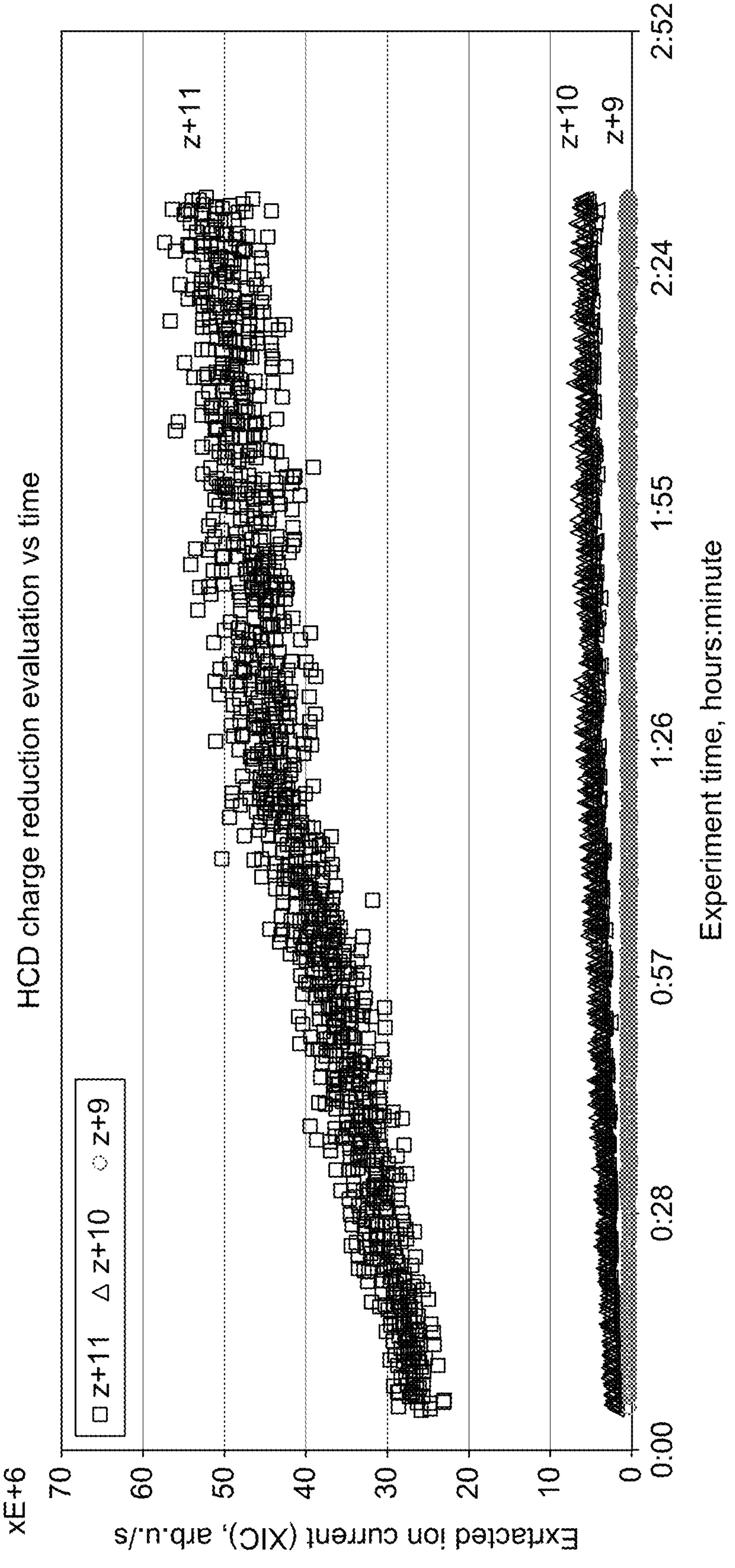
FIG. 11 is a graph of ion current per charge state of a HCD cell having the electrode assembly of FIGS. 5 to 10 against time over the course of experiment 2.
Figure 12:
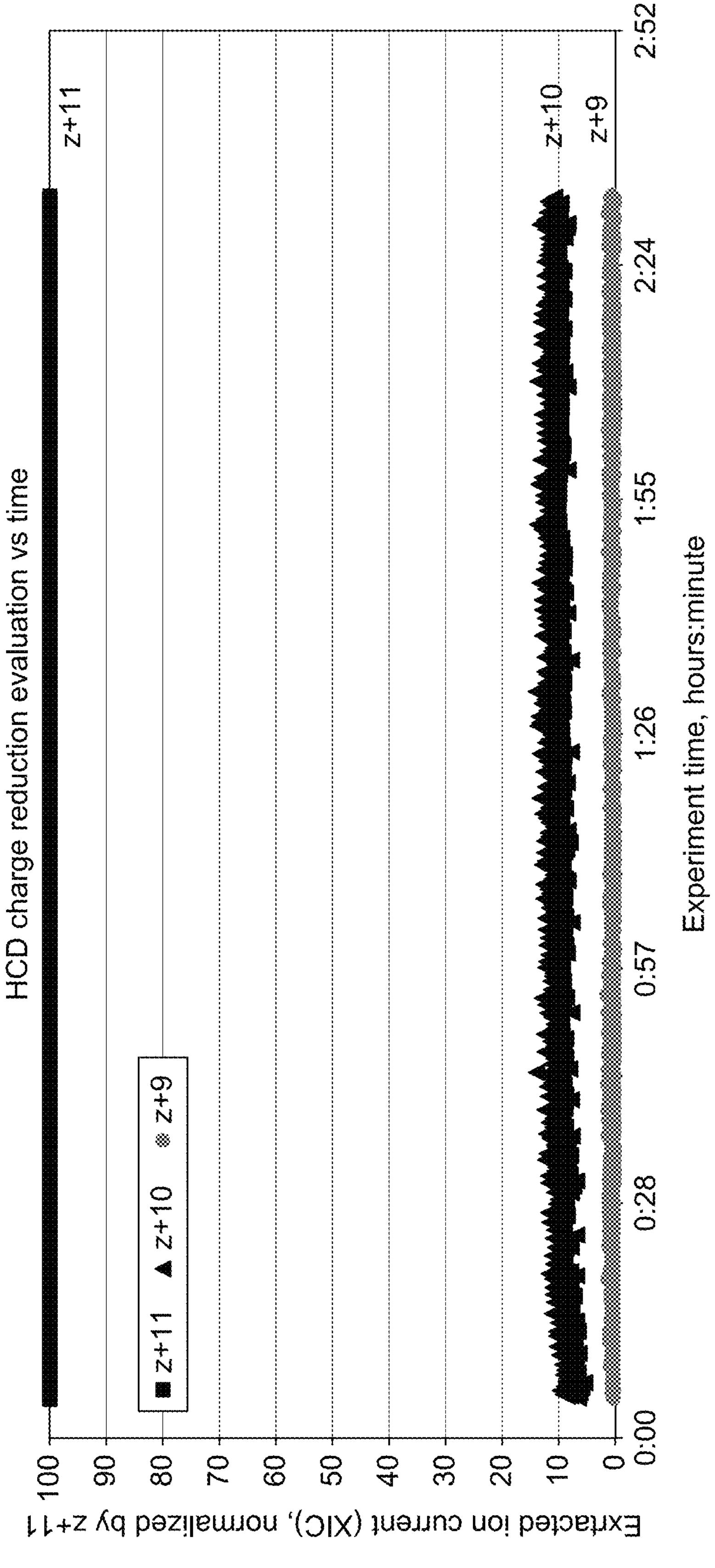
FIG. 12 is a graph of the data of FIG. 11 where the extracted ion current has been normalised by the extracted ion current of the isotope having charge state (+11) at each point in time.
Figure 13:
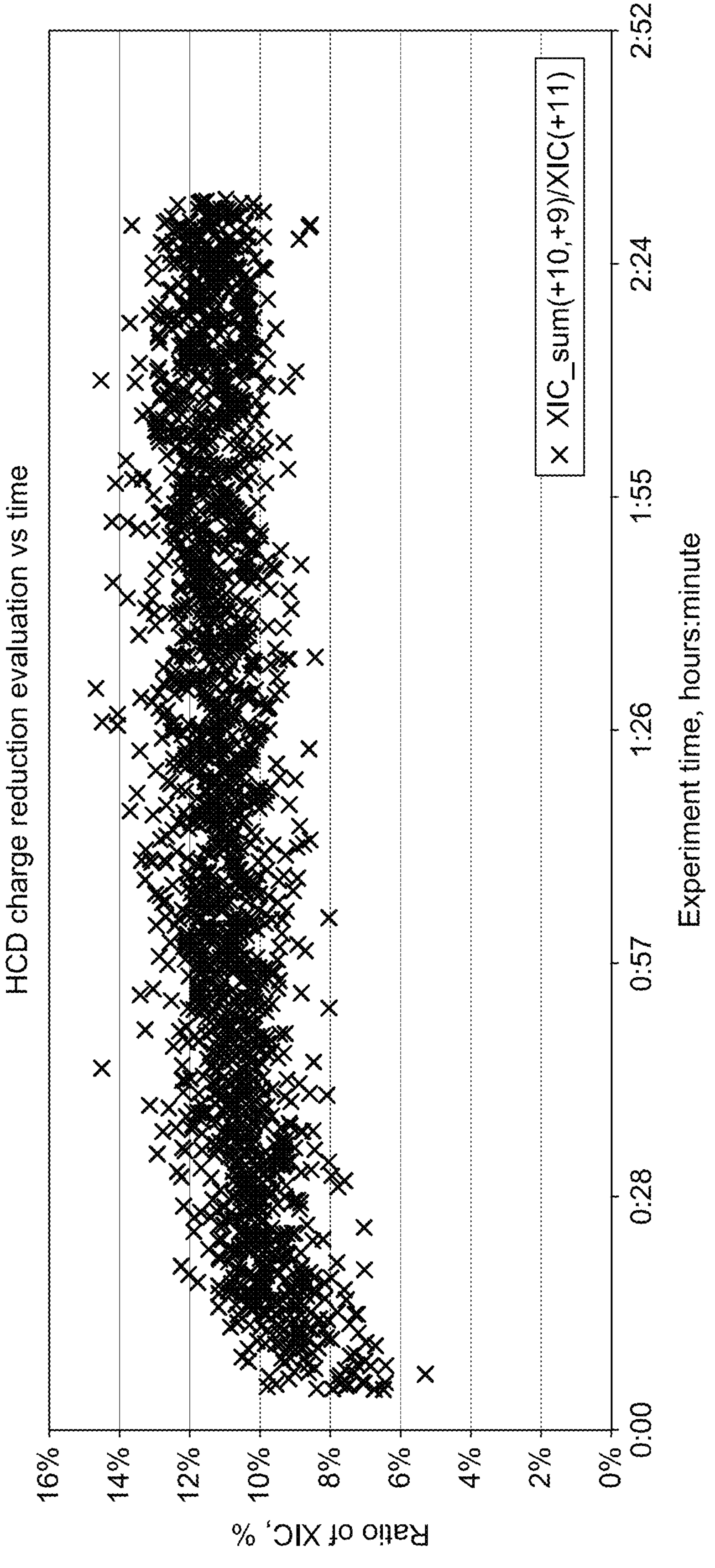
FIG. 13 is a graph of charge reduction against time for experiment 2.

The results of an experiment, referred to herein as experiment 2, involving the same isolated charge state (+11) of multiply charged ubiquitin ions as in experiment 1 in a HCD (Higher-energy collisional dissociation) cell having the electrode assembly 100 of the claimed invention shown in FIGS. 5 to 10 are provided in FIGS. 11 to 14. As in experiment 1, the isolated and trapped ubiquitin ions are then transferred from the HCD cell to a C-trap and injected from the C-trap into an Orbitrap mass analyser for mass analysis). The HCD cell was positioned adjacent to the C-trap such that the C-trap was upstream of the HCD cell. The charge state (+11) of multiply charged ubiquitin ions was trapped in the HCD cell at a trapping time of 500 milliseconds. At time 0:00 (i.e. the start of the experiment), high RF voltage was applied to the RF electrodes 12*a*, 12*b*, 12*a*', 12*b*' of the HCD cell (approximately 1,250 Vpp) and approximately 3,000 Vpp was applied to the RF electrodes of the adjacent C-trap. The application of the maximum RF voltage to the RF electrodes 12*a*, 12*b*, 12*a*', 12*b*' was maintained for a time period of 2 hours and 30 minutes. The key difference between experiment 1 and experiment 2 is that in experiment 1, the HCD cell employed the electrode assembly 1 of FIG. 1 and in experiment 2, the HCD cell employed the electrode assembly 100 of FIGS. 5 to 10. A further difference is that in experiment 2, the maximum RF voltage was applied to the HCD cell for 2 hours and 30 minutes and in experiment 1, the maximum RF voltage was only applied for 1 hour 12 minutes. The remaining conditions of the experiments were substantially the same. Accordingly, the charge reduction data of FIGS. 11 and 13 is directly comparable to that of FIG. 2. Also, the mass spectra of FIGS. 14(*a*) and (*b*) are directly comparable to that of FIGS. 3(*a*) and (*b*).

FIG. 11 is a graph of ion current per charge state of the HCD cell against time for experiment 2. The ion current per charge state of the HCD cell is the mass current of ubiquitin ions of a specific charge state, when the ions are extracted from the HCD cell after being trapped for 500 milliseconds. As shown in FIG. 11, the extracted ion current is variable over the course of the experiment. This is likely due to ion source conditions. In view of this variation, the graph of FIG. 12 was provided. FIG. 12 is a graph of extracted ion current against time where the extracted ion current from the graph of FIG. 11 has been normalised by the extracted ion current of the ions having charge state (+11) at each point in time. Accordingly, the influence of varying total ion intensity on the data has been removed. As can be seen in FIG. 12, the intensity for the ions having charge state (+11) is always at 100% intensity. The ion having the second highest intensity is the ion with charge state (+10). The ion with charge state (+10) has a stable intensity of approximately 10%. Accordingly, the charge reduction is stabilised and approximately only 10% even though the maximum RF voltage was applied to the HCD cell over the greater time period of 2 hours and 30 minutes. This is significantly reduced compared to the charge reduction of over 100% in experiment 1.

The data was of FIGS. 11 and 12 were further processed to produce the graph shown in FIG. 13. FIG. 13 is a graph of charge reduction against time. As discussed above, charge reduction is defined by the ratio of the sum of the extracted ion current of all peaks except for that of the isolated charge state (+11) against that of the isolate charge state (+11). FIG. 13 shows that the charge reduction at the start of the experiment starts at approximately 8% on average and reaches approximately 12% over the first hour. Over the remaining hour and twenty four minutes, the level of charge reduction remains at 12%. Accordingly, the charge reduction is significantly reduced and stabilised at that reduced level when the experiment is performed with a HCD cell having the electrode arrangements 10, 10' of the claimed invention.

Figure 14A:
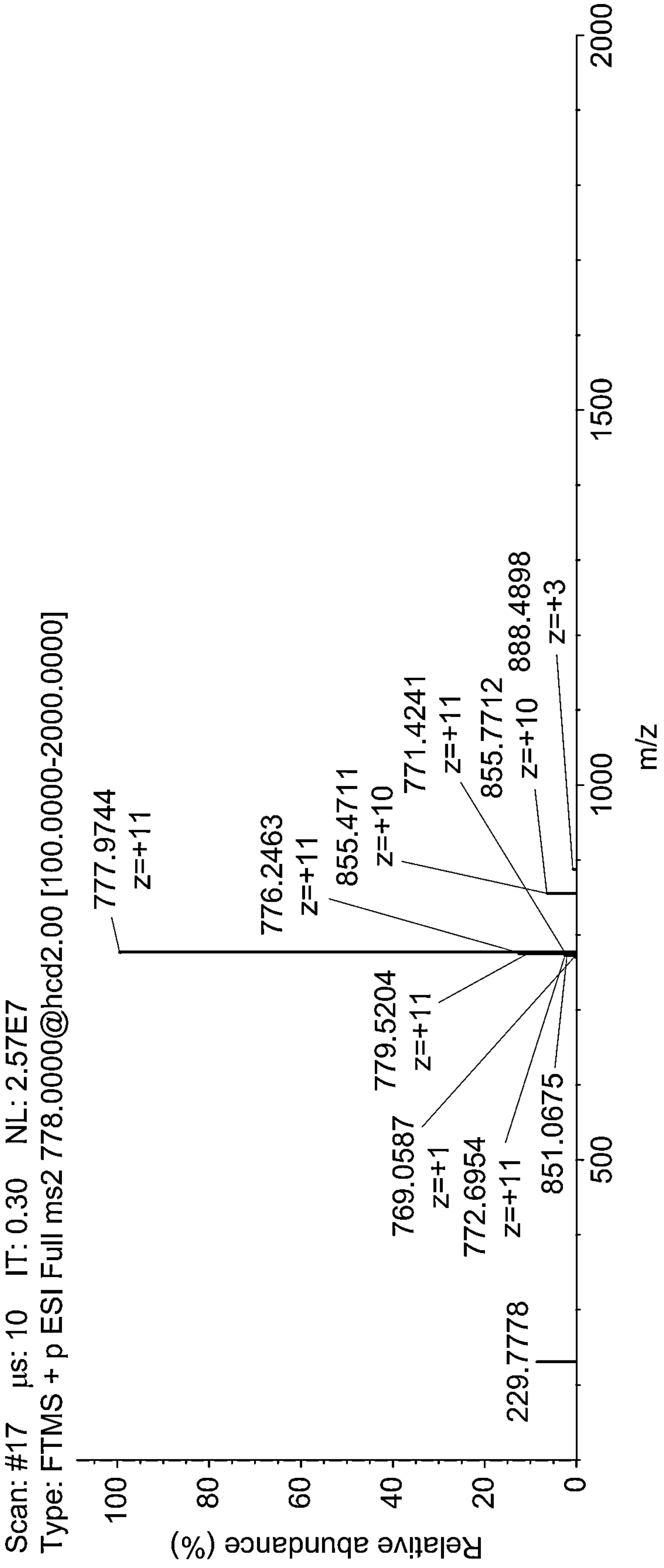
FIG. 14(*a*) is a mass spectrum acquired at the start of experiment 2 (at time 0:00).
Figure 14B:
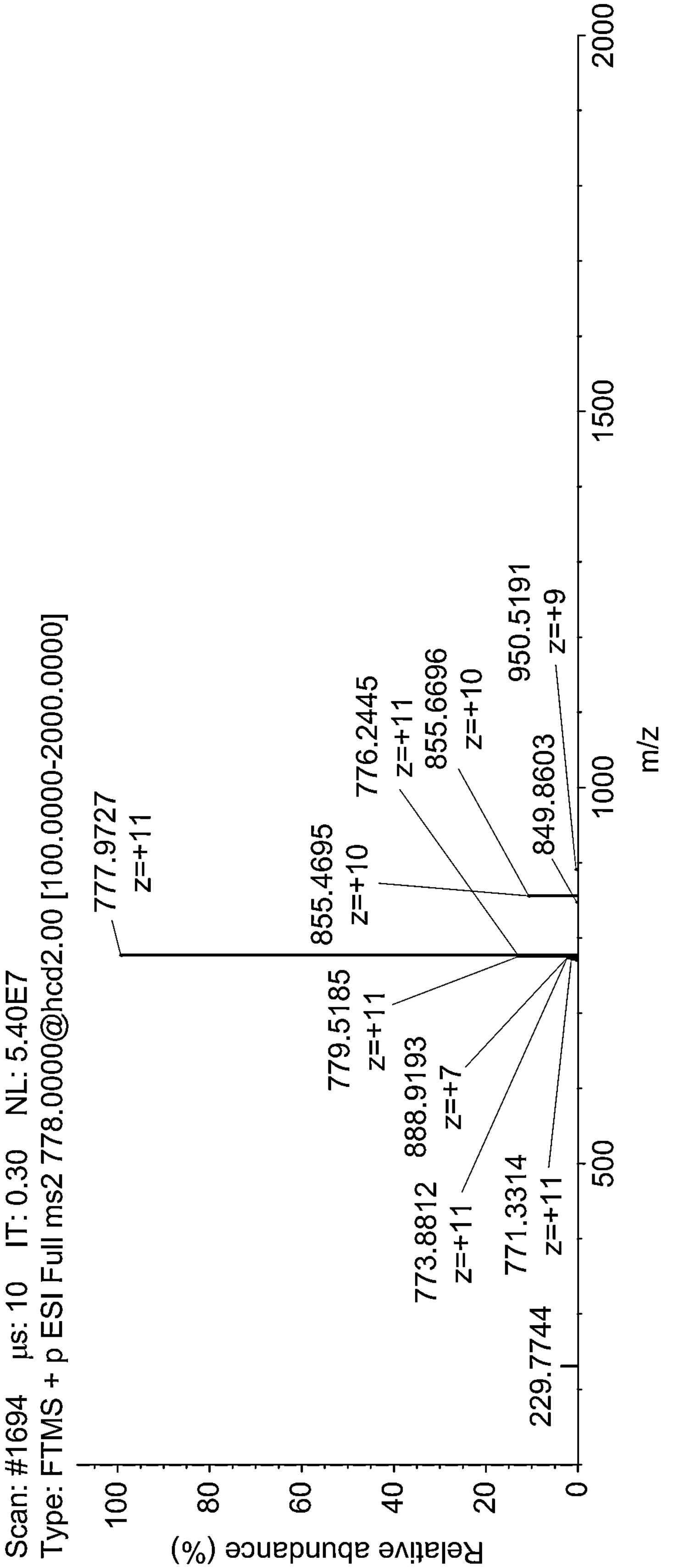

FIG. 14(*a*) is a mass spectrum acquired at the start of experiment 2 (time 0:00). As shown in FIG. 14(*a*), the relative abundance of the isotope having the isolated charge state (+11) at time 0:00 is at 100% and the relative abundance of each of the other isotopes is less than 5%. FIG. 14(*b*) is a mass spectrum acquired during experiment 2 at time 2:30 (2 hours and 30 minutes). Accordingly, the mass spectrum of FIG. 14(*b*) was acquired when the maximum RF voltage had been applied for 2 hours and 30 minutes. On comparing FIGS. 14(*a*) and 14(*b*), it can be seen that over the duration of the experiment, the relative abundance of the isotope having isolated charge state (+11) has not changed. Indeed the mass spectra of FIG. 14(*a*) and of FIG. 14(*b*) look identical, despite the maximum RF voltage being applied for 2 hours and 30 minutes. Accordingly, it can be seen that there has been no charge reduction of the isolated isotope (+11) during the operation of the HCD cell employing the electrode assembly 100 having the electrode arrangements 10, 10' of the claimed invention, as depicted in FIGS. 5 to 10.

In addition to the advantageous electrode arrangements 10, 10' of the claimed invention, a further improvement may be provided by using Megtron6 as the dielectric material 11 forming the PCB instead of Panasonic 1755M. In known electrode arrangements, the dielectric material forming the PCB typically comprises Panasonic 1755M. In the claimed invention, the dielectric material 11 is preferably Megtron6. The use of Megtron6 results in further reduced dielectric losses. Indeed, the dissipation factor, Df, for Megtron6 is 0.0015-0.0020 whereas the dissipation factor, Df, for Panasonic 1755M is 0.014.

Whilst FIGS. 11 to 14 relate to use of the claimed electrode arrangements 10, 10' and assembly 100 in HCD cells, the benefits of the electrode arrangements 10,10' of the present invention equally apply to other reaction cells, in particular collision cells, ion guides, ion traps, ion filters, ion analysers or other devices that generate an RF multipole using planar RF electrodes connected to dielectric materials.

It will be understood that the embodiments described above in relation to FIGS. 5 to 10 are for the purposes of illustration only and that the invention is not so limited. The skilled reader will envisage various modifications and alternatives that fall within the scope of the claims.

Further embodiments of the invention might combine several features of different embodiments described in this specification. E.g. different embodiments may use any one or a combination of pin separators 13, receptacled separators 13' or projecting separators 13" in one electrode arrangement.

Whilst the RF electrodes 12*a*, 12*b*, 12*a*', 12*b*' of FIGS. 5 to 10 (and main body of the RF electrodes 12*a*, 12*b*, 12*a*', 12*b*' of FIGS. 15 and 16) are straight and elongate, the RF electrodes 12*a*, 12*b*, 12*a*', 12*b*' may instead be circular or curved, in some embodiments each electrode being in the plane of the planar dielectric surface and in some other embodiments each RF electrode 12*a*, 21*b*, 12*a*', 12*b*' may be located in the plane perpendicular to the planar dielectric surface. The RF electrodes 12*a*, 12*b*, 12*a*', 12*b*' may be bent in a curve or other shapes. For example, the RF electrodes 12*a*, 12*b*, 12*a*', 12*b*' may be implemented as annular RF electrodes used to form an ion funnel. In this arrangement, the separators 13, 13', 13" (which may be any one of pin separator 13, receptacled separator 13' or projecting separator 13") may connect the dielectric material 11 to an outer periphery of the annular RF electrodes. For example, the annular RF electrodes may comprise protruding portions 12*c* extending radially from the outer periphery of the annular RF electrodes towards the dielectric material 11. The protruding portions 12*c* may be received within corresponding receptacles 13*e* of the receptacled separators 13'. The receptacles 13*e* may be located on the major planar surface of the dielectric material 11.

The first and second minor side walls 101, 102 may be bent or curved.

The size of the space between the first and second electrode arrangements 10, 10' may be varied. For example, by changing the distance between the dielectric materials 11 or by varying the thickness of the head portion 13*a* of each pin separator 13, or by varying the thickness of the bottom wall 13*f* of each receptacled separator 13' or by varying the height of each projecting separator 13".

The DC electrodes 14 are described as being etched on the surface of the dielectric material 11 but may instead be formed by other methods. For example, the DC electrodes 14 may be formed by stamping, extrusion, laser cutting or other suitable fabrication methods.

The RF electrodes 12*a*, 12*b*, 12*a*', 12*b*' may be formed by machining, stamping, laser cutting, extrusion, etching etc.

Whilst FIGS. 5 to 10, 15 and 16 show RF electrodes 12*a*, 12*b*, 12*a*', 12*b*' forming a quadrupole, higher-order multipoles, such as hexapoles, octapoles, dodecapoles could also be employed following the same methodology.

Whilst the embodiment shown in FIGS. 5 to 10 has four pin separators 13 and the embodiment shown in FIGS. 15 and 16 has four receptacled separators 13' and two projecting separators 13" for each RF electrode 12*a*, 12*b*, 12*a*', 12*b*'. The invention could be employed with a fewer or greater number of separators 13, 13', 13" (pin separators 13, receptacled separators 13' or projecting separators 13") for each RF electrode 12*a*, 12*b*, 12*a*', 12*b*'. Preferably the number of separators 13 for each RF electrode 12*a*, 12*b*, 12*a*', 12*b*' is not greater than eight and may be, for example, two, three, five, six or eight. Furthermore, the stability of the mounting of the RF electrodes 12*a*, 12*b*, 12*a*', 12*b*' should be considered when determining the number of separators 13 (which may be pin separators 13, receptacled separators 13' or projecting separators 13").

Whilst the separators 13, 13', 13" (pin separators 13, receptacled separators 13' or projecting separators 13") of FIGS. 5 to 10, 15 and 16 are preferentially equally spaced apart along the length of the RF electrodes 12*a*, 12*b*, 12*a*', 12*b*', the separators 13 may not be equally spaced. The separators 13, 13', 13" are preferentially positioned such that the RF voltage is supplied equally to the RF electrodes 12*a*, 12*b*, 12*a*' and 12*b*'.

The separators 13, 13', 13" (pin separators 13, receptacled separators 13' or projecting separators 13") are at least electrically connected to the RF electrodes 12*a*, 12*b*, 12*a*', 12*b*'. The separators 13, 13', 13" (pin separators 13, receptacled separators 13' or projecting separators 13") are described as being permanently connected to the RF electrodes 12*a*, 12*b*, 12*a*', 12*b*', received within the receiving portion 11*a* of the dielectric material 11 and soldered to a conductive pad on the dielectric material 11. Alternatively, the separators 13, 13', 13" could be removable received within the receiving portion 11*a* of the dielectric material 11. In an alternative embodiment, the separators 13, 13', 13" could be permanently connected to the dielectric material 11, received within a receiving portion of the RF electrode 12*a*, 12*b*, 12*a*', 12*b*' and soldered to the RF electrode 12*a*, 12*b*, 12*a*', 12*b*'. Alternatively, the separators 13, 13'. 13" could be removable received within a receiving portion of the RF electrode 12*a*, 12*b*, 12*a*', 12*b*'. In an alternative embodiment, the separators 13, 13', 13" could be removably connected to both the dielectric material 11 and the RF electrode 12*a*, 12*b*, 12*a*', 12*b*'.

In FIGS. 5 to 10, 15 and 16, each separator 13, 13', 13" (pin separators 13, receptacled separators 13' or projecting separators 13") has a projecting portion 13*b* that extends through a through-hole 11*a* in the thickness of the dielectric material 11. Alternatively, each separator 13, 13', 13" may be received within an opening of the dielectric material 11. The opening may only extend partially through the thickness of the dielectric material 11. For example, the separator 13, 13', 13" (pin separators 13, receptacled separators 13' or projecting separators 13") may be received within a recess on the inner surface of the dielectric material 11 (the planar surface of the dielectric material 11 that is proximal to and opposing the respective RF electrode 12*a*, 12*b*, 12*a*', 12*b*'). FIGS. 5 to 10 and 15 show that the projecting portion 13*b* extends beyond the outer major surface of the dielectric material 11 when the RF electrode 12*a*, 12*b*, 12*a*', 12*b*' is coupled to the dielectric material 11. In an alternative embodiment, the projecting portion 13*b* of the separator 13, 13', 13" (pin separators 13, receptacled separators 13' or projecting separators 13") may be flush with the dielectric material 11 when the RF electrode 12*a*, 12*b*, 12*a*', 12*b*' is coupled to the dielectric material 11.

In FIGS. 5 to 10, the DC electrodes 14 are shown to be segmented. However, the DC electrodes 14 may not be segmented.

FIGS. 5 to 10 describe that a single, segmented DC electrode 14 is provided on each dielectric material 11. Alternatively, multiple DC electrodes 14 may be provided on each dielectric material 11. If so, the multiple DC electrodes 14 may have a voltage gradient applied to them via a resistive divider.

The pin separators 13 of FIGS. 5 to 10 are described as having a disc shaped head portion 13*a* and a cylindrical projecting portion 13*b*. However, the separators 13 may be of any other suitable shape. For example, the head portion 13*a* and/or projecting portion 13*b* may have a square or triangular cross-section. Furthermore, the head portion 13*a* may not be planar.

As shown in FIGS. 5 and 8, the diameter of each head portion 13*a* is similar to the width of the respective RF electrode 12*a*, 12*b*, 12*a*', 12*b*'. Typically, the centres of the head portions 13*a* are positioned directly along the central longitudinal axis of the RF electrodes 12*a*, 12*b*, 12*a*', 12*b*'. Alternatively, the diameter of each head portion 13*a* may be smaller or larger than the width of the RF electrode 12*a*, 12*b*, 12*a*', 12*b*'. Indeed, if the head portion 13*a* has a smaller diameter than the width of the RF electrode 12*a*, 12*b*, 12*a*', 12*b*', then the centres of the head portions 13*a* may or may not be positioned along the central longitudinal axis of the RF electrodes 12*a*, 12*b*, 12*a*', 12*b*'. For example, the centres of the head portions 13*a* may be positioned on either side of the central longitudinal axis of the RF electrodes 12*a*, 12*b*, 12*a*', 12*b*'.

For the embodiment shown in FIGS. 5 to 10, the pin separators 13 are described as being connected to the RF electrodes 12*a*, 12*b*, 12*a*', 12*b*' by welding of the head portion 13*a* to the RF electrodes 12*a*, 12*b*, 12*a*', 12*b*'. However, other attachment means are contemplated. For example, the pin separators 13 may be soldered to the RF electrodes 12*a*, 12*b*, 12*a*', 12*b*'. Alternatively, the pin separators 13 may be press-fit into openings/recesses in the RF electrodes 12*a*, 12*b*, 12*a*', 12*b*'.

For the embodiment shown in FIGS. 5 to 10, 15 and 16, the projecting portions 13*b* of the separators 13, 13', 13" (pin separators 13, receptacled separators 13' or projecting separators 13") and/or the through-holes 11*a* may be threaded to maintain the projecting portions 13*b* within the through-holes 11*a*. Alternatively, the projecting portions 13*b* of the separators 13, 13', 13" (pin separators 13, receptacled separators 13' or projecting separators 13") may be press-fit into the through-holes 11*a* to maintain the projecting portions 13*b* within the through-holes 11*a*.

For both the embodiment shown in FIGS. 5 to 10 and FIGS. 15 and 16, each projecting portion 13*b* of the pin separators 13 and the receptacled separators is described as extending orthogonal/perpendicular to the plane of the respective head portion 13*a*. However, each projecting portion 13*b* may instead extend at an oblique angle to the head portion 13*a*.

The separators 13, 13', 13" (pin separators 13, receptacled separators 13' or projecting separators 13") may be spacers/stand-offs.

For the embodiments shown in FIGS. 5 to 10 and FIGS. 15 and 16, the separators 13, 13', 13" (pin separators 13, receptacled separators 13' or projecting separators 13") are preferably formed of a material having low dielectric losses (low dissipation factor Df=tan $\delta$) such that the separators do not heat up in the presence of the RF field generated by the RF electrodes 12*a*, 12*b*, 12*a*', 12*b*'. This therefore avoids outgassing and undesirable changes to analyte molecules. The separators 13, 13', 13" (pin separators 13, receptacled separators 13' or projecting separators 13") are preferably formed of a material having low electric susceptibility (and so low dielectric losses). Accordingly, the separators 13 are preferably electrically conductive and, more preferably, are metallic. However, the separators 13 may also be formed of plastic, ceramics, quartz and other dielectric materials having low dielectric losses (low dissipation factor Df). Preferably, the separators 13 are formed of a material having a dissipation factor Df with $\delta<0.001$, more preferably with $\delta<0.0005$ and most preferably with $\delta<0.0003$. For example, quartz has a dissipation factor of 0.0002 is a preferred material for the separators 13, 13', 13". A conductive connection is provided between the RF supply to the RF electrodes 12*a*, 12*b*, 12*a*', 12*b*' via such an isolating material of the separator 13, e.g. a conductive coating, soldered connection, wired connection, conductive adhesive etc. Forming a separator using a material having low dielectric losses is especially preferred for embodiments having high RF voltages are applied to RF electrodes 12*a*, 12*b*, 12*a*', 12*b*'.

The invention claimed is:

1. An electrode arrangement for an ion trap, ion filter, an ion guide, a reaction cell or an ion analyser, the electrode arrangement comprising:

an RF electrode mechanically coupled to a dielectric material; and at least one DC electrode located between the dielectric material and the RF electrode;

wherein the RF electrode is mechanically coupled to the dielectric material by a plurality of separators that are spaced apart and configured to define a gap between the RF electrode and the dielectric material and wherein each of the plurality of separators comprises a projecting portion and the dielectric material comprises corresponding receiving portions such that on coupling of the RF electrode to the dielectric material, the projecting portion of each separator is received within the corresponding receiving portion of the dielectric material;

wherein the RF electrode has a surface opposing the dielectric material;

wherein the DC electrode extends across the dielectric material such that at least a part of the DC electrode lies directly between the surface of the RF electrode and the dielectric material; and wherein the proportion of the surface area of the surface of the RF electrode which is shielded from the dielectric material by the DC electrode is at least 50%.

2. The electrode arrangement of claim 1, wherein the gap defined by the separators is between the surface of the RF electrode opposing the dielectric material and the dielectric material.

3. The electrode arrangement of claim 1, wherein:

the proportion of the surface area of the surface of the RF electrode which is shielded from the dielectric material by the DC electrode is at least 80%.

4. The electrode arrangement of claim 1, wherein the DC electrode is segmented.

5. The electrode arrangement of claim 1, wherein the plurality of separators are electrically conductive.

6. The electrode arrangement of claim 1, wherein the plurality of separators are spaced apart along the surface of the RF electrode.

7. The electrode arrangement of claim 1, wherein each projecting portion extends from the surface of the RF electrode opposing the dielectric material.

8. The electrode arrangement of claim 1, wherein each corresponding receiving portion comprises an opening formed within the dielectric material.

9. The electrode arrangement of claim 8, wherein each opening is a through-hole extending through the dielectric material such that on coupling of the RF electrode to the dielectric material, each projecting portion extends through the corresponding through-hole.

10. The electrode arrangement of claim 1, wherein each separator comprises a head portion from which the projecting portion extends, wherein the head portion is of greater diameter than the projecting portion.

11. The electrode arrangement of claim 10, wherein a diameter of the corresponding receiving portion is the same as or greater than that of the projecting portion and smaller than that of the head portion.

12. The electrode arrangement of claim 1, wherein the DC electrode is located on the surface of the dielectric material opposing the RF electrode.

13. The electrode arrangement of claim 1, wherein the DC electrode extends along the entirety of the surface of the dielectric material opposing the RF electrode, except for exposed portions of the dielectric material, wherein the exposed portions comprise the area of the dielectric material in contact with and/or adjacent to each separator when the RF electrode is coupled to the dielectric material.

14. The electrode arrangement of claim 13, wherein the exposed portions have grooves therein.

15. The electrode arrangement of claim 1, wherein the RF electrode, the DC electrode and the dielectric material are parallel.

16. The electrode arrangement of claim 1, wherein the dielectric material is glass, ceramic or printed circuit board.

17. The electrode arrangement of claim 1, wherein each separator is permanently secured to the RF electrode.

18. The electrode arrangement of claim 17, wherein each separator is welded to the RF electrode.

19. The electrode arrangement of claim 1, wherein the RF electrode comprises a plurality of openings corresponding to the projecting portions of the plurality of separators such that on coupling the RF electrode to the dielectric material, each projecting portion is received within each opening of the RF electrode.

20. The electrode arrangement of claim 1, wherein each separator is configured to be connected to an RF voltage supply.

* * * * *